US009262775B2

(12) United States Patent
Lamont

(10) Patent No.: US 9,262,775 B2
(45) Date of Patent: Feb. 16, 2016

(54) METHODS, DEVICES AND SYSTEMS FOR PROVIDING MOBILE ADVERTISING AND ON-DEMAND INFORMATION TO USER COMMUNICATION DEVICES

(71) Applicant: Carl Lamont, St. George, UT (US)

(72) Inventor: Carl Lamont, St. George, UT (US)

( * ) Notice: Subject to any disclaimer, the term of this patent is extended or adjusted under 35 U.S.C. 154(b) by 0 days.

(21) Appl. No.: 14/179,001

(22) Filed: Feb. 12, 2014

(65) Prior Publication Data
US 2014/0344062 A1 Nov. 20, 2014

Related U.S. Application Data

(60) Provisional application No. 61/823,331, filed on May 14, 2013.

(51) Int. Cl.
G06Q 30/02 (2012.01)

(52) U.S. Cl.
CPC .................. *G06Q 30/0267* (2013.01)

(58) Field of Classification Search
CPC .................................. G06Q 30/0267
USPC ....................................... 705/14.64
See application file for complete search history.

(56) References Cited

U.S. PATENT DOCUMENTS

| 6,526,335 | B1 * | 2/2003 | Treyz ..................... G01C 21/26 307/10.1 |
| 6,711,474 | B1 * | 3/2004 | Treyz ..................... G01C 21/26 455/414.1 |
| 6,996,387 | B2 * | 2/2006 | Chan ............................. 455/301 |
| 7,707,218 | B2 | 4/2010 | Gocht et al. |
| 8,090,359 | B2 * | 1/2012 | Proctor, Jr. ......... G06Q 30/0623 455/414.3 |
| 8,229,415 | B1 * | 7/2012 | Chen et al. ................ 455/422.1 |
| 8,385,913 | B2 * | 2/2013 | Proctor, Jr. ......... G06Q 30/0623 455/41.2 |
| 8,413,884 | B2 * | 4/2013 | Lim et al. ...................... 235/375 |
| 2005/0261990 | A1 | 11/2005 | Gocht et al. |
| 2007/0118423 | A1 * | 5/2007 | Always .................. G06Q 30/02 705/14.62 |
| 2008/0142599 | A1 * | 6/2008 | Benillouche et al. .... 235/462.41 |
| 2008/0268876 | A1 | 10/2008 | Gelfand et al. |

(Continued)

FOREIGN PATENT DOCUMENTS

| GB | 2 449 510 A | 11/2008 | |
| GB | 2449510 | * 11/2008 | .............. H04L 12/28 |
| GB | 2483094 | * 2/2012 | ......... G06Q 30/0207 |

OTHER PUBLICATIONS

GB 2449510 to Asim Bucuk "Creation, Management and Authentication of Links between People, Entites, Objects, Devices".*

(Continued)

*Primary Examiner* — Thomas M Hammond, III
*Assistant Examiner* — Breffni X Baggot
(74) *Attorney, Agent, or Firm* — Stoel Rives LLP

(57) ABSTRACT

Methods, systems, software, computer-readable media, and the like relate to providing and receiving relevant data from one or more entities. Data is received by a wireless user device directly from a wireless transmitter. The data may be provided to a stationary or moving user. A consumer in a vehicle, for instance, may have a smartphone, mobile phone, tablet PC, navigation system, or other similar mobile device, and can use such device to interact with a geographically proximate advertising module having a wireless transmitter. The wireless transmitter may also be stationary or moving, and can be incorporated into structures such as a vehicle, a billboard, a building, a road sign, a traffic light, or the like.

21 Claims, 15 Drawing Sheets

(56) References Cited

U.S. PATENT DOCUMENTS

| | | | |
|---|---|---|---|
| 2009/0061901 A1 | 3/2009 | Arrasvuori et al. | |
| 2009/0171786 A1 | 7/2009 | Kuo et al. | |
| 2009/0198592 A1* | 8/2009 | Emerson | 705/27 |
| 2009/0232354 A1 | 9/2009 | Camp, Jr. et al. | |
| 2009/0271819 A1 | 10/2009 | Cansler et al. | |
| 2009/0303036 A1 | 12/2009 | Sahuguet | |
| 2009/0327073 A1 | 12/2009 | Li et al. | |
| 2010/0030636 A1 | 2/2010 | Vijayshankar et al. | |
| 2010/0036717 A1* | 2/2010 | Trest | G06Q 30/0207 705/14.1 |
| 2010/0138286 A1* | 6/2010 | Steinberger | G06Q 20/00 705/14.16 |
| 2010/0174598 A1 | 7/2010 | Khan et al. | |
| 2010/0198700 A1 | 8/2010 | Ramaswamy | |
| 2010/0223150 A1 | 9/2010 | Bryant et al. | |
| 2010/0241494 A1 | 9/2010 | Kumar et al. | |
| 2010/0280905 A1* | 11/2010 | Rothschild | G06Q 30/02 705/14.63 |
| 2010/0325236 A1 | 12/2010 | Savinen et al. | |
| 2010/0332315 A1* | 12/2010 | Kamar | G06Q 30/02 705/14.46 |
| 2011/0010241 A1 | 1/2011 | Mays | |
| 2011/0029363 A1 | 2/2011 | Gillenson et al. | |
| 2011/0045852 A1 | 2/2011 | Kovach | |
| 2011/0082728 A1 | 4/2011 | Melikian | |
| 2011/0119132 A1 | 5/2011 | Morton et al. | |
| 2011/0218864 A1 | 9/2011 | Pentz et al. | |
| 2012/0072271 A1* | 3/2012 | Dessert et al. | 705/14.1 |
| 2012/0159542 A1* | 6/2012 | Minwalla | H04N 21/25841 725/36 |
| 2012/0191242 A1* | 7/2012 | Outwater et al. | 700/236 |
| 2014/0136411 A1* | 5/2014 | Cho et al. | 705/44 |

OTHER PUBLICATIONS

Stephen Lepitak, "American Airlines begins pilot Beacon scheme to send realtime in-app messaging within airports," The Drum, Nov. 4, 2014, accessible online at: http://www.thedrum.com/news/2013/11/04/american-airlines-begins-pilot-beacon-use-send-realt-ime-app-messaging-within.

Jessica Davies, "Coca-Cola explores iBeacons as marketing tool for World Cup sponsorship," The Drum, Jan. 13, 2014, accessible online at: http://www.thedrum.com/news/2014/01/13/coca-cola-explores-ibeacons-marketing-tool-world-cup-sponsorship.

Parmy Olson, "Meet the Company That Tracks More Phones Than Google or Facebook," Forbes, Oct. 30, 2013, accessible online at: http://www.forbes.com/sites/parmyolson/2013/10/30/meet-the-company-that-tracks-more-phones-than-google-or-facebook/?partner=yahoomag.

Junaio "The Most Advanced Augmented Reality Browser," webpage Copyrighted 2014, accessible online at: http://www.junaio.com.

Metaio GmbH, "junaio Augmented Reality Browser," iTunes app store, updated Jan. 10, 2014, accessible online at: https://itunes.apple.com/us/app/junaio-augmented-reality-browser/id337415615?mt=8.

Metaio, webpage Copyrighted 2014, accessible online at: http://www.metaio.com/.

Metaio, "Developer Portal," webpage Copyrighted 2014, accessible online at: https://dev.metaio.com/junaio/.

Metaio, "End User Licensing Agreement ("EULA") for the Junaio App (Version 25/09/2013)," Sep. 25, 2013, accessible online at: www.metaio.com/licenses/junaio-app-eula/.

Metaio, "Developer Portal: metaio Cloud Plugin," webpage Copyrighted 2014, accessible online at: https://dev.metaio.com/cloud-plugin/.

Wikipedia, "Junaio," online encyclopedia last updated Nov. 14, 2012, accessible online at: http://en.wikipedia.org/wiki/Junaio.

Sharif Sakr, "Augmented reality browser Junaio offers less 'clunky' apps, new API for developers (video)," engadget, Jun. 20, 2012, website available online at: http://www.engadget.com/2012/06/20/augmented-reality-browser-junaio/.

Trak, "IKEA Awarded Best Augmented Reality App of 2012," wordpress.com, Nov. 14, 2012, accessible online at: http://junaio.wordpress.com/2012/11/14/ikea-gets-best-augmented-reality-app-of-2012/.

Layar "Products," website accessed Feb. 12, 2014, at https://www.layar.com/products/app/.

Mary Godfrey, "Shopkick App Offers Users Rewards and Helps Them Find Deals," ABC News Blogs, Nov. 24, 2013, accessible online at: http://gma.yahoo.comiblogs/abc-blogs/shopkick-app-offers-users-rewards-helps-them-deals-191022255--abc-news-tech.html.

Automatic, "Blog," website Copyrighted 2013, accessible online at: http://blog.automatic.com/.

Goekhan Korkmaz et al., "Urban Multi•Hop Broadcast Protocol for Inter•Vehicle Communication Systems," VANET'04, Oct. 1, 2004, Philadelphia, Pennsylvania, USA.

Walter Franz et al., "Inter-Vehicle-Communications Based on Ad Hoc Networking Principles," The FleetNet Project, Universitaetsverlag Karlsruhe Jun. 2005, ISBN 3-937300-88-0.

\* cited by examiner

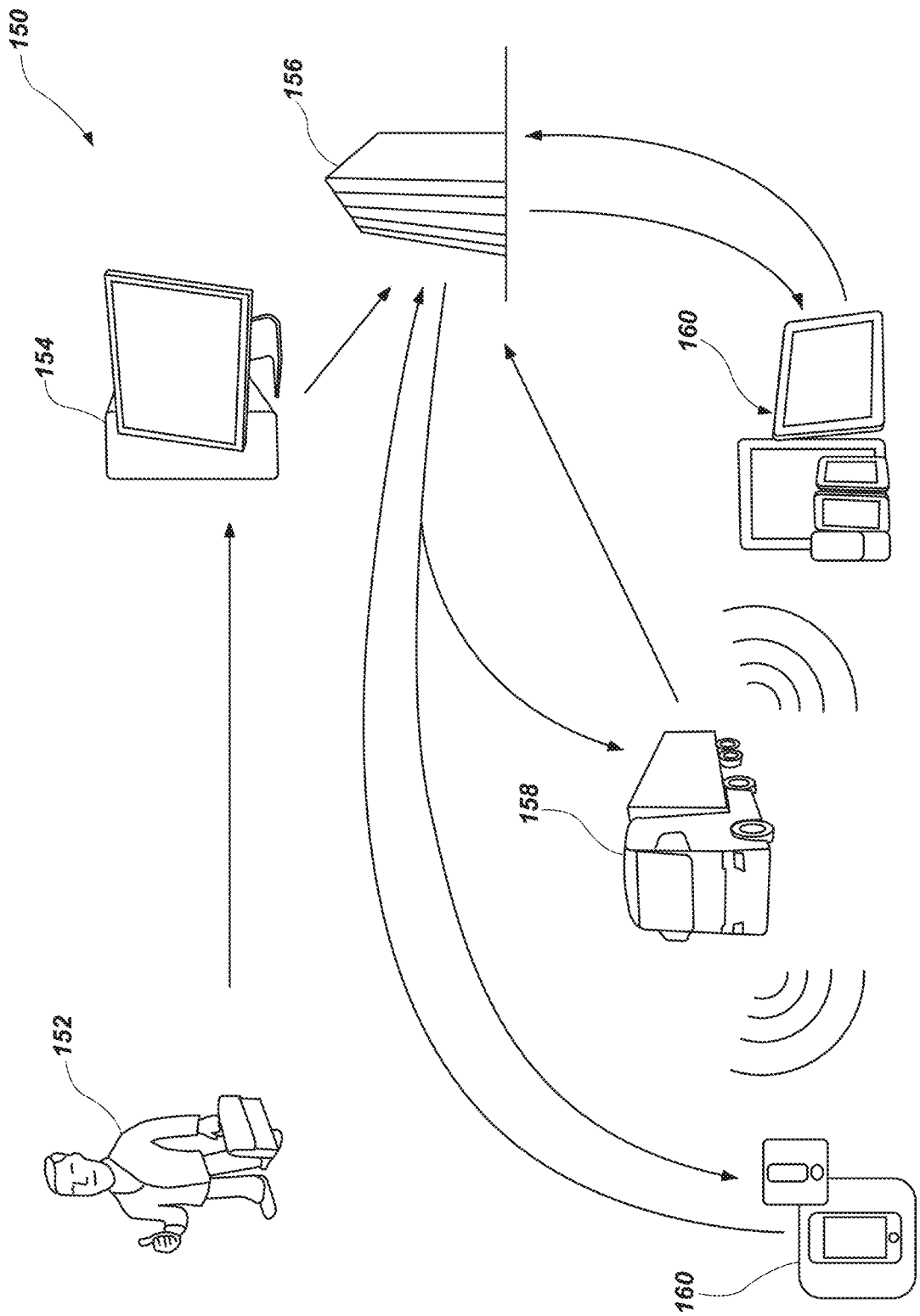

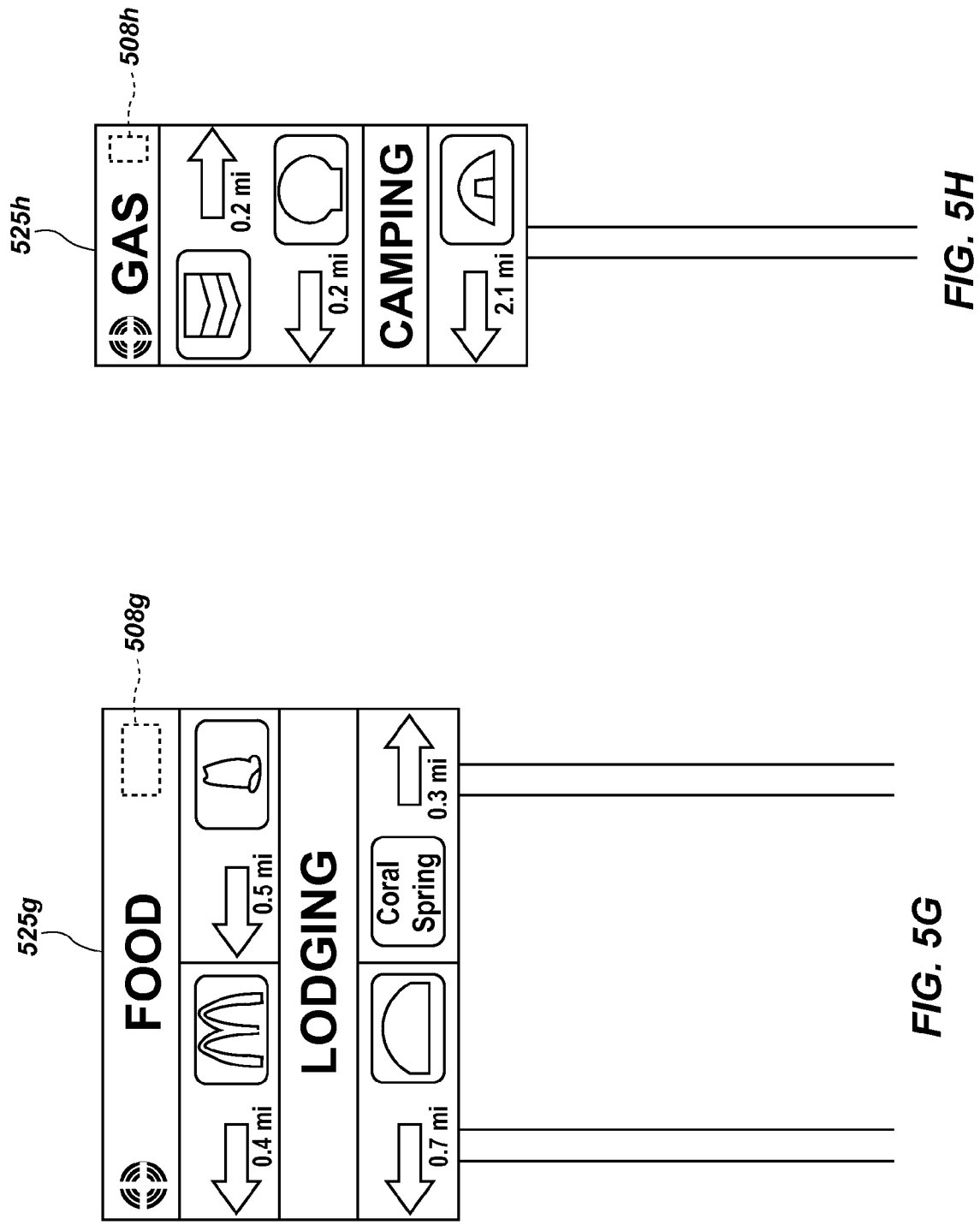

METHODS, DEVICES AND SYSTEMS FOR PROVIDING MOBILE ADVERTISING AND ON-DEMAND INFORMATION TO USER COMMUNICATION DEVICES

CROSS-REFERENCE TO RELATED APPLICATIONS

This application claims the benefit of priority under 35 U.S.C. §119(e) to U.S. Provisional Patent Application No. 61/823,331, titled "METHODS AND SYSTEMS FOR PROVIDING MOBILE ADVERTISING AND ON-DEMAND BUSINESS INFORMATION TO USER COMMUNICATION DEVICE," filed on May 14, 2013, the entire disclosure of which is, by this reference, incorporated herein.

TECHNICAL FIELD

The present disclosure generally relates to communication systems and advertising. More particularly, embodiments of the present disclosure relate generally to advertising in a manner allowing retrieval of information from a variety of sources. More particularly, aspects of the present disclosure relate to on-demand acquisition by an end-user of advertising and other data from businesses, retailers, corporations, broadcasters, etc. while moving, and from a variety of sources, including other vehicles, road signs, billboards, buildings, living beings, and the like.

BACKGROUND

Consumers are often inundated with advertising information. Frequently, however, much of the information is irrelevant to the particular interests of the consumer. For instance, a consumer on a mobile device may be browsing the Internet and see banner advertisements, pop-up ads, and the like which have little, if any, relevance to the consumer's interests. Even if such advertising makes use of so-called cookies or a browser history to attempt to provide relevant information, the information still often holds little geographical or topical interest. Similarly, when driving down the highway, a user may see billboard after billboard. Typically, however such billboards provide little interest and, if of interest, may pass by too quickly to safely obtain any desired information for contacting the company. Currently, businesses of all sizes need a novel, more accurate, and cost-effective means for advertising and providing consumers with any relevant advertising and other data, twenty-four (24) hours a day, and seven (7) days a week. Such consumers may benefit from being able to selectively receive pertinent and quality information and advertisements, rather than simply receiving unsolicited information that is difficult to capture or which holds little relevance for a consumer.

There is a growing trend of image scanning and decoding, such as the use of Quick Response (QR) codes and image recognition software that enables entities to deliver a bulk of information to users with use of camera-equipped mobile devices. Such QR codes may, however, have various limitations. For instance, the codes must be visible to a user in order to capture them. Due to slower shutter speeds that cause blurred images, it is also often difficult to obtain a suitable scan if either the user or the code is moving at a velocity or relatively different direction than one another. Moreover, capturing such codes while moving may be dangerous, particularly if a person using a vehicle is attempting to capture the codes. Further still, a QR code may often refer to an Internet address or provide other information that is available over a network. If the device is not then currently connected to a data network, such as the Internet, the consumer may be unable to access the information.

In some efforts to provide relevant information, companies such as FOURSQUARE™ may provide social networking and so-called "check-ins" at venues and establishments using location based services ("LBS"). Global positioning systems ("GPS") may be used to enhance the LBS. Users that check-in to a particular establishment can receive promotions; however, this often requires that the user be in the general vicinity of the establishment, as evaluated using the GPS components of a consumer's mobile electronic device (e.g., smartphone). Other services, such as FROGZOG™, provide text message-based coupons to a user. A user may send a text message providing a general location (e.g., a zip code or city). The text message may also provide some textual description of goods or services of interest. For instance "Food" and a zip code may be sent to a service provider. In response, the service provider may look for restaurants and other food service providers within the zip code, city, or other desired geographical area, and send back a coupon or the like matching the request.

Smartphone applications or "apps" allow providers of the app to deliver information and promotions to users using push notifications; however, these notifications can often be unwanted or irrelevant to a consumer. Deal-of-the-day companies, such as GROUPON™ or LIVING SOCIAL™ may also provide certificates to consumers; however, the consumers may not have an option to choose the types of information they wish to receive. Rather, all users receive access to the same certificates and coupons. Furthermore, users may be able to select only regional areas of their country for their area of interest, and cannot further specify specific areas on-demand.

Another example of the incompatibility of choosing particular advertisements is ROXIMITY™. ROXIMITY™ is a location-based daily deal service that expects to interact with automobile systems, including vehicles equipped with the SYNC™ technology (i.e., vehicles produced by FORD MOTOR COMPANY™). It can be cumbersome for a user to receive notifications from particular businesses, particularly in high-traffic areas like Times Square in New York City. The sheer volume of advertisements and notifications received can be overwhelming.

SUMMARY

In accordance with aspects of the present disclosure, embodiments of methods, systems, software, computer-readable media, and the like are described or would be understood and which relate to providing and receiving relevant data from businesses, retailers, corporations, broadcasters, and the like. The information may be provided to a physically static or a dynamic user. A consumer in a vehicle, for instance, may have a smartphone, mobile phone, tablet PC, navigation system, or other similar mobile device, and can use such device to interact with a geographically proximate advertising module. Relevant data may be exchanged directly between the electronic device of the consumer and the advertising module.

Methods of obtaining relevant data may include exchanging information using various communication protocols that include, but are not limited to, use of Location Based Services (LBS), (including Global Positioning Service GPS), Geographic Information System (GIS), dedicated short-range communications ("DSRC"), infrared ("IR"), extended IR, Bluetooth, Bluetooth Low Energy (BLE), barcode scan, image recognition, radio frequency identification ("RFID"), RuBee, near-field communication ("NFC"), 802.11 communications ("WiFi"), cellular networks, satellite signals, Zigbee, Z-Wave, or other protocols, or any combination of the foregoing.

A consumer may want to receive further business information from one or more objects he or she comes across while performing any number of daily activities. For instance, a user walking down the street or shopping at a mall or other shopping center, may use embodiments of the present disclosure to access and obtain data of potentially relevant businesses. More particularly, a consumer in a motor vehicle may desire to obtain business information from any one of a plurality of stationary or moving objects. These objects may include, but are not limited to, other personal vehicles, business vans, trucks, tractor-trailers, taxicabs, buses, trains, airplanes, helicopters, blimps, drones, ships, boats, business and retail stores, restaurants, homes, buildings, towers, satellites, antennas, traffic lights, billboards, signboards, all types of signage (e.g., traffic signs, highway signs, street signs), living beings, performance venues (e.g., entertainment venues, sports venues, musical venues, etc.), or any combination of the foregoing.

With the aforementioned features, embodiments of the present disclosure may allow a consumer to quickly and efficiently obtain data on-demand. This may be especially useful when consumers are not expecting a need or desire to obtain data, but are quickly able to do so if and when the need unexpectedly presents itself in front of a consumer.

Other aspects, as well as the features and advantages of various aspects, of the present disclosure will become apparent to those of ordinary skill in the art through consideration of the ensuing description, the accompanying drawings and the appended claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIG. 1B is a flow chart illustrating a process, in accordance with an embodiment of the present disclosure;

FIGS. 5C-5H illustrate example road signs that may be used to transmit data, according to some embodiments of the present disclosure;

DETAILED DESCRIPTION

Figure 1A:
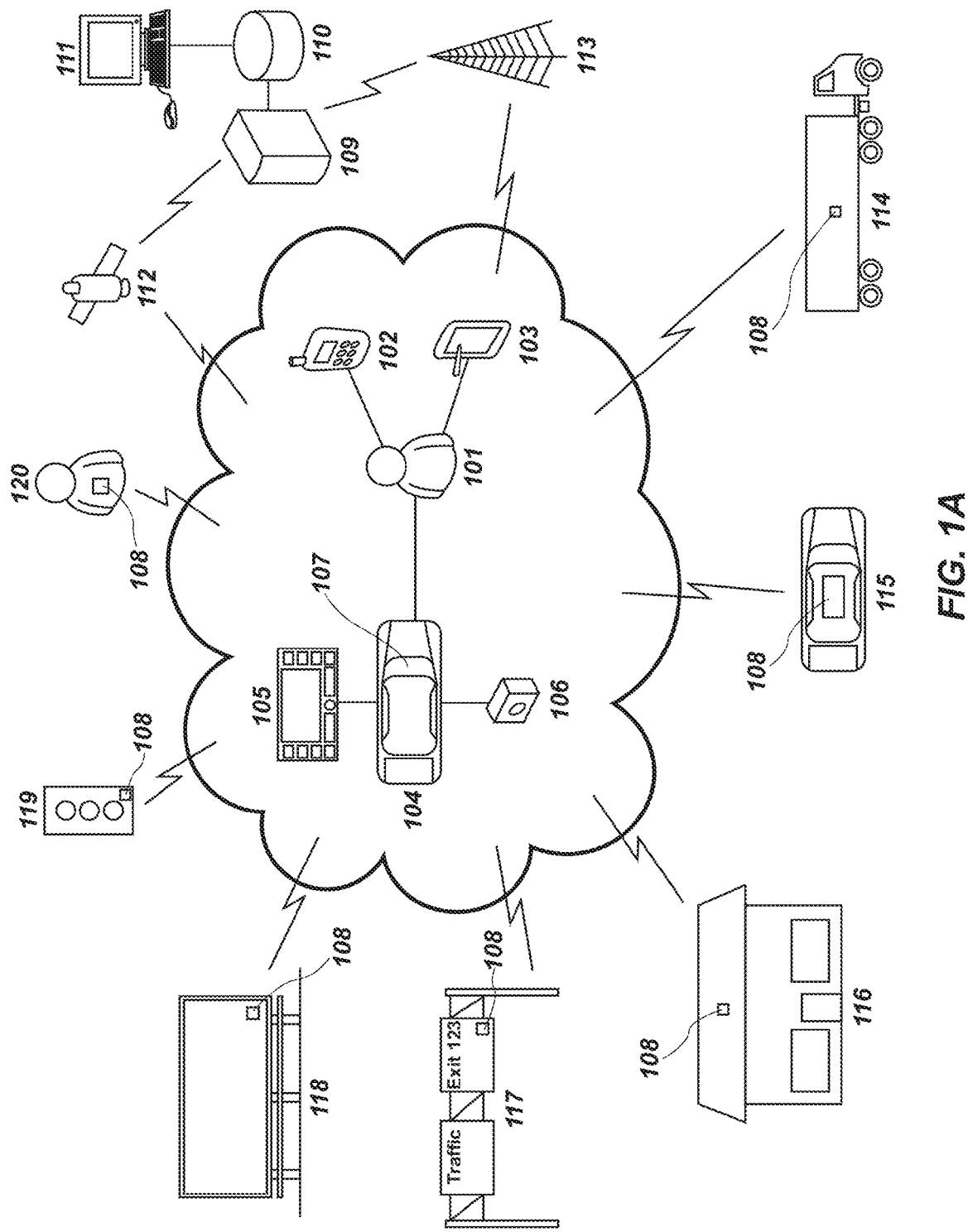
FIG. 1A schematically illustrates a network of example devices providing communication between a consumer and a variety of mediums, according to one embodiment of the present disclosure.

In accordance with aspects of the present disclosure, embodiments of methods, systems, software, computer-readable media, and the like are described or would be understood and which relate to an active mobile transportation environment for permitting advertisements, data, announcements, promotions, education, and/or outreach platforms, to be pushed/pulled through to customer via a vehicle. Vehicles, as disclosed herein, may be thought of as "billboards on wheels" due to their mobility (i.e., rather than only 'geo-fencing' a specific bricks and mortar business address that comes into play when you are only near their establishment). As a non-limiting example, vehicles may include autos, trucks, buses, taxis, planes (commuter, commercial), trains (mass transit, freight shipment), boats (ferries, cruise lines, ocean liners, commercial container shipments), construction vehicles, recreational vehicles, satellites, cellular sources (e.g., cellular towers). Further, as described more fully below, a vehicle may include a human element (HE), additionally and directly through mobile consumer as another source of streaming vicinity advertising platforms. These platforms may be applied, for example globally, nationally, regionally, statewide, city-wide, and/or within municipal/local communities for conveying, for example only, advertisements, data, information, promotions, and/or entertainment, or other forums.

Targeted advertising may be performed based on, for example only, dates, times, geographical and/or vicinity locations. Also, advertising campaigns may be customized (e.g., re-targeted) for a particular business, company, agency, and/or entertainment venue at any time of the day. The advertising campaigns can be independent or in alliance with other business partners, having similar goals within their business mantra, and/or sharing the same advertising campaign for their product and/or services. Various embodiments of the present disclosure may generate additional revenue platforms for businesses. Further, consumers may gain additional benefits of promotions, awards, discounts, cash, etc. as well, where data is streamed effortlessly and simplistically to the consumers meeting their own set of preset criteria for relevant benefits. Various embodiments of the present disclosure may create new advertising platforms, which may be less dependent on generic industry standards that typically incorporate television, radio, print, outdoor, or permanent location billboard displays that may be very expensive. Various embodiments may allow new marketing strategies to reenergize the industries capabilities to make them ubiquitous.

Systems, methods, devices, software and computer-readable media according to the present disclosure may be configured for use in communicating information, including text, audio, video, or other information. In some embodiments, such information may specifically be referred to as "data", "business data" or "business information" which may include a variety of types of information. Example types of "data", "business data" and "business information" may include, but is not limited to, advertisements, promotional materials, promotional deals, coupons, business cards, or other information, or any combination of the foregoing. Communication systems may be used to facilitate marketing of businesses, products, or services. Moreover, embodiments of the present disclosure may be used for a variety of businesses and industries. By way of illustration only, food service businesses, consumer good businesses, service-providers, and the like may all make use of embodiments of the present disclosure to provide advertising or other data for themselves directly, for products/services they provide, or even on behalf of others.

Referring to one embodiment of the present disclosure in more detail, in FIG. 1A, there is shown a network of devices between a consumer, or user, and advertising mediums. Optionally, the user may be in a vehicle; however, the embodiments of the present disclosure are not limited to use with consumers in vehicles, or even to moving consumers.

In accordance with one embodiment, a consumer, who is referred to herein as user 101, can have access to a computing device, such as a mobile phone 102, tablet PC 103, or any form of a electronic device—whether portable or not. A mobile phone 102 may be a conventional cell phone or a smartphone, such as an IPHONE™ branded smartphone, a phone using an ANDROID™ operating system, a BLACKBERRY™ smartphone, a WINDOWS MOBILE™ smartphone, a phone running the TIZEN™ operating system, or the like. The user 101 may optionally be a driver or passenger of a user vehicle 104. In some embodiments, the user vehicle 104 may be equipped with a navigation system 105. Such a navigation system 105 may be portable, or built directly into the user vehicle 104. Other potential capabilities or components usable by the user 101 may include a vehicle-integrated camera 106 capable of taking pictures of the surroundings of the user vehicle. Furthermore, in some or all embodiments of the present disclosure, the mobile phone 102, tablet PC 103, or other electronic device may communicate with the user vehicle 104, navigation system 105, vehicle-integrated camera 106, or other system or component, or any combination of the foregoing. Optionally, such communication may occur via any wireless communication, including but not limited to Bluetooth, although other wireless or wired (e.g., data transfer cable) communication may also be used. The user vehicle 104 may also be equipped with an integrated Wi-Fi-enabled device capable of communicating with cellular towers and/or other Wi-Fi compatible devices. For the remainder of the description of the embodiments of the present disclosure, the mobile phone 102, tablet PC 103, navigation system 105 and vehicle-integrated camera 106 may all be referred to individually and collectively, as types of "user communication devices."

Still referring to FIG. 1A, the user 101 may come to view, or be generally proximate, several advertising mediums while seated in the user vehicle 104, or while in some other vehicle, or even while outside of a vehicle. Example advertising mediums that may be viewed or proximate the user 101 may include, but are not limited to: (a) a commercial vehicle 114, such as a tractor trailer, semi-truck, van, food-truck, bus, train, airplane, helicopter, blimp, ship, boat, or the like; (b) an advertising vehicle 115, such as a taxicab, company car, moving billboard, or other vehicle; (c) a physical structure 116, such as a retail store, restaurant, building, tower, or residence; (d) traffic signs 117, which may include street signs, highway signs, exit signs, caution signs, construction signs, or the like, including signage controlled or managed by a federal, state, or municipal governmental entity; (e) billboards 118, and all types of signage; (f) a traffic light 119, or (g) a living being, such as a human being 120.

Any of these advertising mediums may be equipped with an advertising module 108. Such advertising modules 108, which may also be referred to as beacons, may include components for transmitting and/or receiving communications so as to actively communicate with a user communication device. Where the advertising module 108 includes both transmission and reception capabilities, the advertising module 108 may be referred to as a "transceiver module". Other embodiments are, however, contemplated, where the advertising module 108 can only transmit data, or only receive.

In some embodiments, a user may selectively or optionally receive data from a compatible advertising medium equipped with an advertising module 108. Data may include, but is not limited to, advertisements, coupons, promotions and offers, loyalty rewards, contests, gaming, links to URL websites, Cloud, or mobile application downloads, phone numbers, fax numbers, e-mail addresses, menus, scientific and medical studies information, data collection for all industries, tutorials, instructions, business cards, GPS coordinates of an associated commercial location, or any other relevant information for efficiently marketing a business. In at least one embodiment, a user may download or otherwise access a mobile application on a user device, which application may be specifically programmed to process communications with an advertising module 108. Such communications may include one-way or two way communications. Further, the application may display data in a user-friendly, visually aesthetic method.

Furthermore, commands to the user communication device may be made using voice-recognition technology in some embodiments. The user communication device may therefore include a voice recognition component. Upon receiving a voice command, the user communication device can, in turn, optionally obtain additional data from local storage, the Internet or a data server 109 comprising data storage 110. The content of the data storage 110 can be progressively and continually updated by one of a plurality of administrative computers 111, any or all of which may be used by a business wishing to provide an advertising medium or business related data. It is noted that data server 109 may comprise a Cloud application, which may include, for example, business data (e.g., coupons, ads, etc.) and user account information. The Cloud application may be configured to convey data to a user (i.e., via a user communication device) and/or an advertising medium. As a more specific example, the Cloud application may be configured to convey data to a user based on a location of the user, user interests, etc., as described more fully below.

Further, as described herein, a device application of a user communication device may be configured to convey, for example only, location information (e.g., GPS data) and/or request to the Cloud application. It is further noted that embodiments of the present disclosure may include a web application, which is configured to enable, for example, a business representative to provide data to the Cloud application. Further, the web application may enable the business representative to make payments and view results (e.g., how much and/or what type of their data has been sent to user communication device and/or advertising mediums).

Obtaining advertising data from the data server 109 may be enabled by using the user communication device to connect over a network connection enabled by a satellite 112 (or a drone), cellular tower 113 or other component (e.g., a WiFi access point).

FIG. 1B is a flow chart 150 illustrating a contemplated process, according to an embodiment of the present disclosure. As illustrated in flow chart 150, a business representative 152 (e.g., a business owner or a business manager) may desire to have his/her data included within an advertising system. The business representative 152 may generate an account, sign up his/her business (e.g., via a computer 154), and provide data to a server 156 (e.g., a Cloud server). It is noted that business representative 152 may designate a start date and an expiration date for his/her promotion and for his/her account.

Further, geo-locations of advertisement mediums 158 (e.g., automobiles, boats, planes, trains, etc.) and/or user communication devices 160 may be transmitted to server 156, which may push the data (e.g., the data provided by business representative 152) to one or more advertising mediums 158 and/or one or more user communication devices 160. Any data received by advertising medium may be forwarded to user communication device 160. Upon receipt of data, user communication device 160 may provide an alert (e.g., a beep or a vibration), which may be received (e.g., visually, audibly, and/or physically) by an end-user. Further, the end-user may visit a business location (e.g., a physical location or a website) to act on the received data. More specifically, for example, the end-user may visit a business location to redeem a coupon (e.g., buy one, get one free) for the business received from the server 156 at user communication device 160. It is noted that if an end-user does not have a user communication device application installed on his/her user communication device, the end-user may still access data via a web application (e.g., via server 156).

It is noted that a business may determine criteria related to advertisement of its data. For example, an advertiser (i.e., a business) may determine that it wants its data transmitted within a certain geographical area, during certain time periods (e.g., time of days, days of the week, days of the month, during holidays, etc.). More specifically, for example, a business may decide that it wants its data to be transmitted between highway mile marker 10 thru 100 on a specified route, certain geographic areas defined by certain GPS coordinates, and/or a location in a specified mile radius.

Additionally, a business may choose to have its data transmitted during, for example, commuter rush hours, or for a specific calendar day, or during a specified event (e.g., the Super Bowl, local festivals, the World Series, Thanksgiving, Christmas etc). As will be appreciated by a person having ordinary skill in the art, embodiments of the present invention may enhance a business's potential for 24/7 visibility and exposure. Further, embodiments the present invention may also engage an end-user with a new found empowerment of getting relevant information and promotions on their terms.

Figure 2:
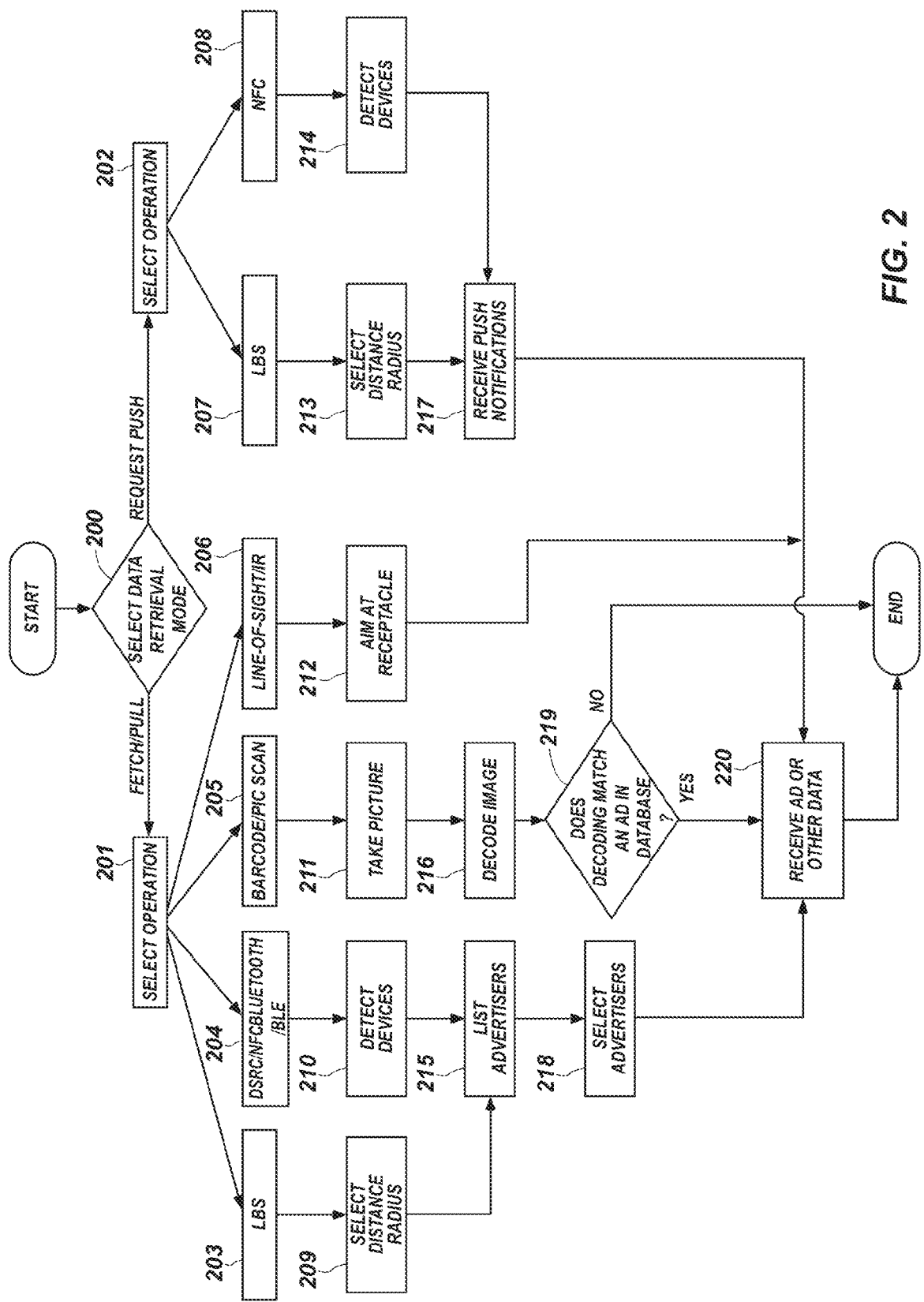
FIG. 2 illustrates a flow chart of options and methods by which a consumer can communicate with any of a variety of mediums, according to one embodiment of the present disclosure.

FIG. 2 is a flowchart representing an example process by which a user (e.g., user 101 of FIG. 1) may obtain relevant data from an advertiser. In the first act 200, the user may select whether he or she prefers to either: a) fetch or pull relevant data to a user communication device; or b) request relevant data be pushed to the user communication device. Fetching or pulling data enables a user to selectively choose where, when, and what specific info he or she wants to obtain as relevant data from a source (e.g., an advertiser), or set of sources or some other provider. For example, referring back to FIG. 1, if a user 101 wishes to obtain relevant data from an advertising vehicle 115, such as a pizza delivery car, which happens to be driving or parked nearby, the user 101 may selectively do so by attempting to communicate with the advertising module 108 mounted to, contained within, or otherwise integrated with the advertising vehicle 115. The same method may be applied to any of the other advertising mediums shown in, or described in reference to, FIG. 1, or as otherwise disclosed herein.

Returning now to FIG. 2, if the user wishes to fetch/pull relevant data, he or she may additionally select an optional mode of retrieval in act 201. In another embodiment, the user may allow integrated software or firmware, a downloaded application, a browser page, or some other component of the user communication device to execute and automatically choose a mode of operation for receiving relevant data from an external advertising medium.

A first mode of relevant data retrieval may allow a user to elect to receive the relevant data based on his or her location using GPS or other LBS (act 203). Such an embodiment may allow participating advertisers to be listed or displayed (act 215) by, for instance, displaying them on a map presented on a display screen of a user communication device. These participating advertisers may be displayed on the screen as clickable pins or icons. Once clicked, a list of relevant data may be provided in act 220. The user may optionally choose to use a default or previously set search radius for locating participating advertisers, although the user may be able to manually change the radius in act 209. This may be done by, for instance, selecting from a list of different radii available in a display menu, by typing in a specific radius (e.g. in miles, feet, kilometers, meters, etc.), by zooming in or out of the map displaying the participating advertisers, or in any other manner, or some combination of the foregoing.

A second mode of relevant data retrieval may be available for selection by a user in act 204. An additional, or other, example mode may include using a one or two-way wireless communication protocol. Example protocols that may be used can include, but are not limited to, DSRC, NFC, RFID, RuBee technology, Bluetooth technology, Bluetooth Low Energy (BLE) technology, WiFi, Z-Wave, Zigbee, wireless broadcast communication, or any other protocol, including those with related IS O/IEC standards. Further, it is noted that any known and suitable wireless standard may be used to carry out embodiment of the present disclosure. Upon selection, a user communication device may be used to detect whether it can communicate with, or receive communications from, an external advertising medium (act 210). If compatible, the user may be able to obtain advertising or other data, which can optionally include a list of detected advertisers and respective relevant advertising data or other data. A list of one or multiple advertisers, or their respective business or advertisement data, may be provided where wireless technologies broadcast signals and detect all compatible devices within a broadcast range. The broadcast signals may include a signal to pair devices for communication. Upon request from the user communication device, the user communication device and advertising module may then be paired or otherwise connected to allow transmission of data from a singular business entity or multiple business entities. In other embodiments, however, the broadcast signal may simply include the business or advertising data so that some pairing, linking, communication session, or the like may be unnecessary.

A third mode of relevant data retrieval can include a barcode or picture scan in act 205. In this method, the user may take a picture of an object in act 211. Such a picture may include a linear barcode, such as a Universal Product Code ("UPC") symbol, a matrix barcode, such as a QR code, or any other object. The picture may even include a car, package, commercial product, or some other object about which the user is interested in receiving further information or relevant data from or about. In act 216, a software application on the user communication device, at a server (e.g., as accessible through a browser or dedicated application), or distributed application may process and decode the picture. There are currently numerous software programs available to the public that decode barcodes or provide image recognition analysis to link and extract further data. Once decoded, a database may be checked in act 219 to verify if any matching results are found in response to the decoding of the picture. If any relevant data is verified to exist in the database, all or some relevant data, or the most likely relevant data, may be forwarded to the user communication device in act 220.

Another mode of relevant data retrieval may include the user of IR data transmissions, extended IR, or line-of-sight propagation in act 206. In some embodiments, this mode may provide the quickest and/or most direct way for a user to obtain relevant data from an external advertising medium. At act 212, the user may simply point his or her user communication device (e.g., a mobile phone 102, tablet PC 103, etc. from FIG. 1) to a receiving receptacle integrated on the external advertising medium (e.g., on the advertising module 108 of FIG. 1), or otherwise make a specific request for data. In response, at act 220, the compatible advertising medium may return a signal containing data or a link to further data to the user communication device as long as the user communication device is in a physical position to receive the signal. The return signal may be sent by the advertising medium in response to detecting a request or link with the user communication device, be broadcast for receipt by any compatible user communication device, or sent in other manners. In some embodiments, a user may set filters for different types of data to be received, as discussed in more detail herein. When a specific request is received for data, the filters may also be applied to pull only relevant, desired data. Alternatively, a user making a specific request to pull data may allow filters to be bypassed.

An act of pointing the user communication device toward a receiving receptacle is, however, merely illustrative. In other embodiments, for instance, other actions or gestures may be received or interpreted by the user communication device. As an example, a user may tap the user communication device, swipe or otherwise move a finger across a touch screen in a predetermined manner, press a specific button, or otherwise perform an action that can be interpreted as a request to receive business data from an advertising medium. Other example gestures may include tilting or shaking the user communication device. In still other embodiments, a user communication device may include a camera that can read a facial expression, a user's eyes, or other expressions or the like to perform an action. In some embodiments, different gestures may have different responses. For instance, a tap on the user communication device may perform one action (e.g., turn on a feature to pull data) while a different action, such as a double tap may perform a different action (e.g., turning on a feature to allow business data to be pushed to the user communication device). Of course, other actions or gestures, or responses, may be provided.

Still referring to FIG. 2, the user can optionally, alternatively choose to receive push notifications, or pushed data, from an external advertising medium in act 200. In one embodiment, the user may allow integrated software/firmware, a downloaded application, a browser page, or the like of the user communication device to automatically choose the best or desired mode, or even potentially multiple or all modes, of operation to receive push notifications of relevant data from an external advertising medium. In such an embodiment, a user may not be required to point, or even to specifically request, data. Rather, the user can set his or her communication device to be open to receive relevant data pushed to the device. In such an embodiment, the user may of course also be able to turn off push notifications. As a result, a user could turn on the communication device for an extended or brief period of time, to receive notifications and data during such period. In other embodiments, a predetermined period of time may be used to allow data to be pushed to the user communication device. For instance, a tap, double tap, swipe, gesture, or any other movement may be used to turn on a feature allowing pushed data for a period of ten seconds, twenty seconds, thirty seconds, sixty seconds, two minutes, five minutes, ten minutes, or some other longer or shorter predetermined period. Optionally, the predetermined period may be user defined (e.g. within user settings), or multiple different periods may be set-up for use with different gestures, movements, or other input.

In another embodiment, the user may elect to receive either LBS push notifications in act 207, DSRC/NFC/Bluetooth push notifications in act 208, or both. LBS push notifications may use an internal GPS module or other location service of the user communication device to actively track the location for use in searching for advertisers within a particular radius or distance in act 213. Similarly, DSRC/NFC/Bluetooth push notifications may use associated communication radios and devices to actively search for other compatible devices within a broadcast and frequency range (act 214).

In accordance with some embodiments of the present disclosure, a user may at any time customize the desired manner of receiving push or pull notifications. Such notifications may be received as pop-up notifications, e-mails, SMS and text messages, in-app notifications, audio alerts, physical alerts, visual alerts, or in other manners, or any combination of the foregoing. The notifications may contain relevant data or provide a further link to relevant data in act 220.

Figure 3A:
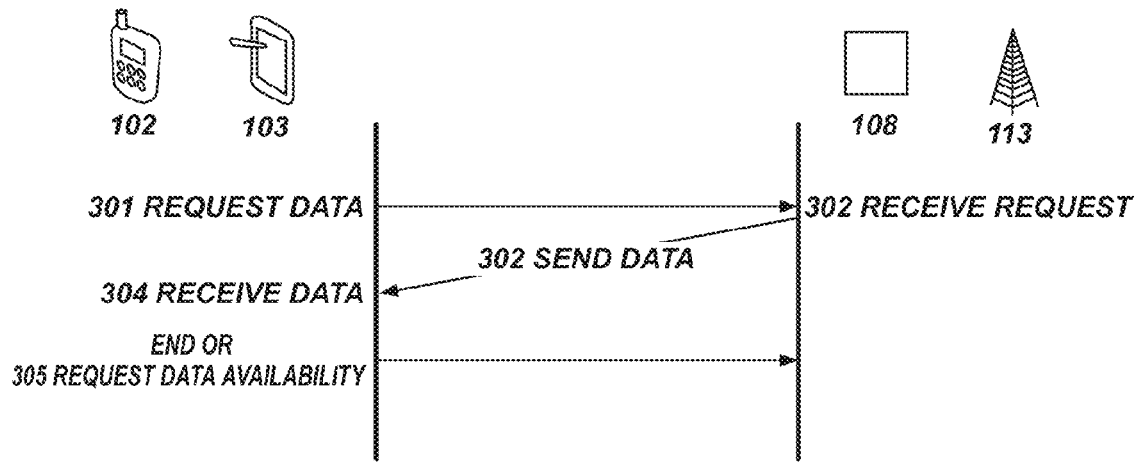
FIG. 3A illustrates a sequence diagram between a consumer device and an advertising module of an advertising medium, according to one embodiment of the present disclosure.

Turning now to FIG. 3A, a sequence diagram is shown to illustrate an example of a manner in which communication may occur between a user communication device (e.g., mobile phone 102 or tablet PC 103 of FIG. 1) and a transceiver module (e.g., advertising module 108 of FIG. 1). At act 301, a user communication device, within range or in sight, may make a request to obtain relevant data. The request may be sent to the transceiver module, which can receive the request in act 302. If data is available, the transceiver module may return any available data to the user communication device in act 303 and the user communication device may receive the data in act 304. Receipt of the data may be dependent upon the user communication device still being within range or in sight of the transceiver module. If the user wishes to obtain further relevant data not obtained in act 304, the user can potentially request further data in act 305. While such data may be potentially requested from the same or another transceiver device, the data may also, or alternatively, be requested from a cellular tower (e.g., cellular tower 113 of FIG. 1) or satellite (satellite 112 of FIG. 1) in some illustrative embodiments.

While FIG. 3A illustrates an example in which a user communication device may request data and a transceiver module may receive the request and then send relevant data, other embodiments may operate in other manners. For instance, in lieu of making a request that is received by a transceiver module, a user device may open a communication channel to receive broadcast or other data that is sent even absent a request. Thus, in FIG. 3A, the data request in act 301 may instead be a request to open a communication channel. The act 302 of receiving the request may therefore be eliminated, although data may continue to be sent in act 303.

Figure 3B:
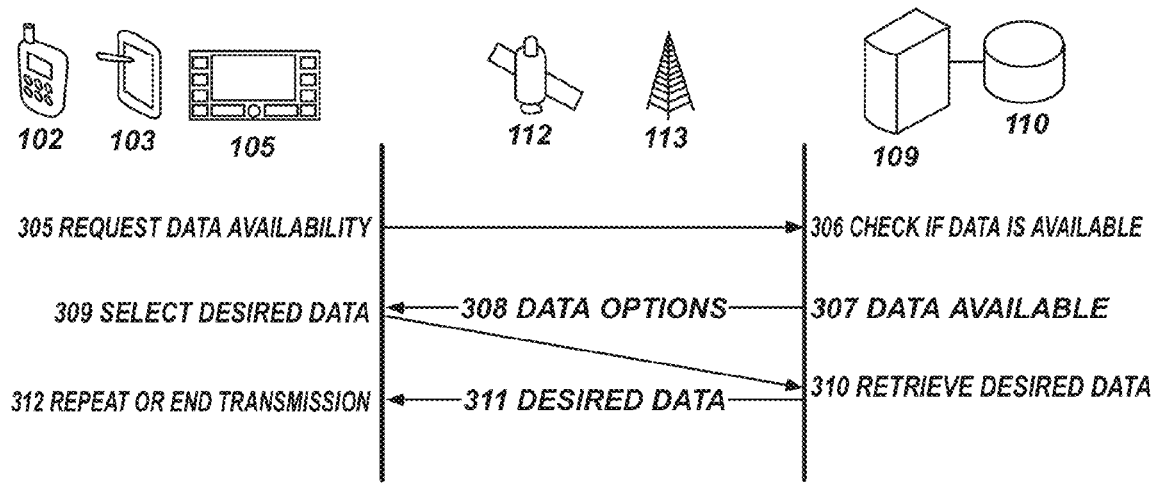
FIG. 3B illustrates a sequence diagram between a consumer device and data server via a cellular tower, satellite or other data network component, according to one embodiment of the present disclosure.

Now referring to FIG. 3B, another example embodiment is provided in which data may be transmitted between a user communication device and a data provider (e.g., data server 109 and data store 110 of FIG. 1). Optionally, such communication may occur over a communication network such as the Internet and/or Cloud, and can be facilitated by network communication devices (e.g., a cellular tower 113 or satellite 112 of FIG. 1).

In FIG. 3B, if a user is using a pull or fetch system, data availability may be requested in act 305. The request can be received by a cellular tower, satellite, or other network communication device, and be forwarded to a data provider. In act 306, the data provider may determine whether the requested data is available. When the data provider verifies the requested data is available (act 307), relevant data options may be provided to the user communication device in act 308. Such communications may also be passed through the network communication devices. The user may receive the options and select one or more desired data elements from a potential list of options in act 309. Optionally, the selection can be returned to the data provider, and the data provider can retrieve desired data in act 310. The desired data may then be returned to the user communication device in act 311. In act 312, the user may wish to end the transmission. Alternatively, the user may request further relevant data, at which point the transmission can return to act 305.

FIG. 3B is also merely illustrative and can be varied in a number of manners. For instance, the request in act 305 may already include descriptions of desired data to be returned. As a result, rather than returning a selection of data options in act 308, the method may include the data provider checking to see if data is available in act 306 according to the criteria. The method may then jump to returning desired data in act 311. Further, while FIG. 3B is shown as using communication from a user communication device (e.g., mobile phone 102, tablet PC 103, or navigation system 105 of FIG. 1), and a data service provider (e.g., data server 109 and data store 110 of FIG. 1) through network communication components (e.g., satellite 112 and cellular tower 113 of FIG. 1), such components are merely illustrative. In other embodiments, for instance, the network communication components may be eliminated. A mobile or other advertising module may include components to act as the data server, and can potentially deliver directed information relevant to a particular business, or can contain multiple sets of information for multiple businesses.

Figure 4:
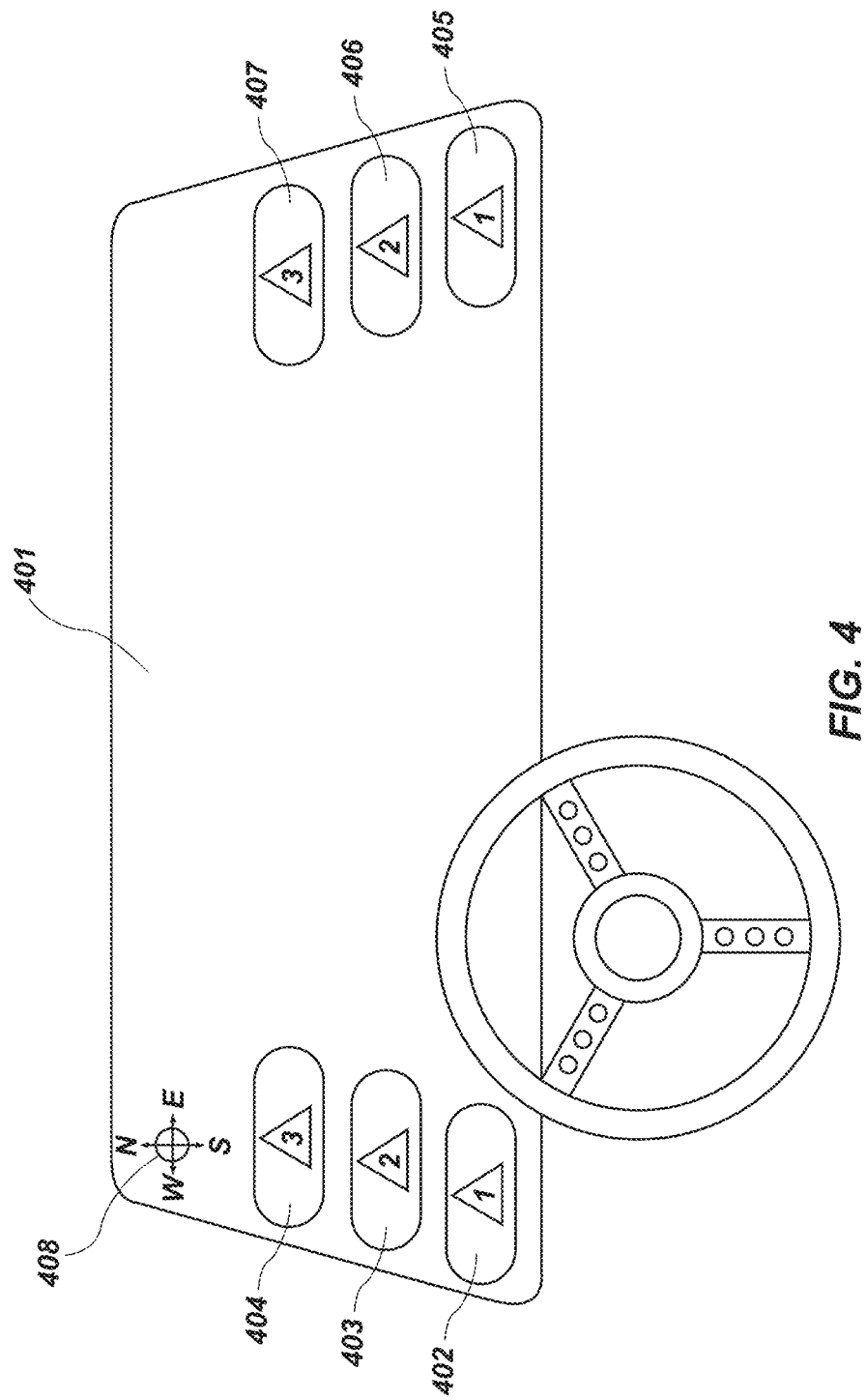
FIG. 4 illustrates a windshield of a user's motor vehicle with heads-up display ("HUD") capability for displaying advertisements or other relevant data, according to one embodiment of the present disclosure.

Turning now to FIG. 4, an example embodiment shows a user's view of an example windshield 401 of a user vehicle (e.g., vehicle 104 of FIG. 1). In this embodiment of the present disclosure, relevant data can potentially be displayed on a heads-up display ("HUD") of the windshield 401. The relevant data can be visible in any or all of elements 402-407 of the HUD. Preferably, the relevant data may be displayed in a manner that is not distracting to a user's driving performance. Indeed, in some embodiments, the relevant data may not be displayed at all, unless a speed is below a threshold level.

Visible elements 402-407 may further represent augmented reality ("AR") graphics. AR may include a computer-generated, real-time view of a physical, real-world environment where elements are augmented using, for example, video, audio, GPS data input, or some combination of the foregoing. In another embodiment of the present disclosure, AR graphics may appear on the screen of a user communication device. One of ordinary skill in the art would assume in view of the disclosure herein that there is no limit of how much relevant data can be displayed on the HUD, and that orientation, positioning, brightness, timing, and the like of relevant data can be altered to comply with safety standards or the user's preferences. Furthermore, an interactive compass or map 408 can optionally be displayed on the HUD to assist the user in locating detected external advertising mediums, or businesses corresponding to data retrieved from an external advertising medium. The user may cycle through and select particular relevant data displayed on the HUD by use of integrated steering controls, car navigation buttons, voice-recognition technology, or via a communicatively linked mobile phone, tablet PC, or the like.

In this embodiment of the present disclosure, one aspect allows the user to toggle between the output sources by which the relevant data is displayed. For example, the user may have requested relevant data from his or her mobile phone, tablet PC, or other computing device. Once this data is received on the mobile phone, tablet PC, or other computing device, the user may subsequently request the received data to appear on a navigation system or the HUD windshield 401. Additionally, the displayed data may be toggled by the user to appear on one device or several devices simultaneously. Consequently, when data is received from an advertising medium or another source, the data may also be stored for later recall and/or for use with other devices of the user.

In any or all embodiments of the present disclosure in which data is received, a filter may be created or used. An example filter may include user preferences to enable retrieval of more desirable data. For example, a user may elect to only receive relevant data from restaurants. In this example, any entity not listed as a restaurant cannot transmit relevant data to the user or user communication device, or the user communication device may disregard or automatically delete such data. Multiple filters can be created, as well as preference lists to permanently, intermittently, and/or temporarily ban communication with particular businesses or businesses of a particular type.

Furthermore, in any or all embodiments of the present disclosure, all data, including but not limited to, requested data, received data, user preferences, filter criteria, downloaded content, pictures, videos, audio, text, messages, cookies and any data history, may be temporarily or permanently recorded to, including but not limited to, an internal or external memory of the user communication device, the advertising medium, a data server, data storage, or other component, or any combination of the foregoing.

Some aspects of the present disclosure may include, without limitation, the ability of a consumer to interact and selectively obtain relevant data and information from a business, advertiser, or broadcaster with the use of a communication device while in a static or dynamically moving environment. More particularly, embodiments of the present disclosure may allow a consumer to obtain relevant data while seated in a moving vehicle, while walking, or even while stationary (e.g., and potentially while advertising mediums move by the user). In moments where a user has little decision-making time and/or limited resources, it allows for a quick and effective method to receive relevant data for either their immediate or future reference.

Figure 5A:
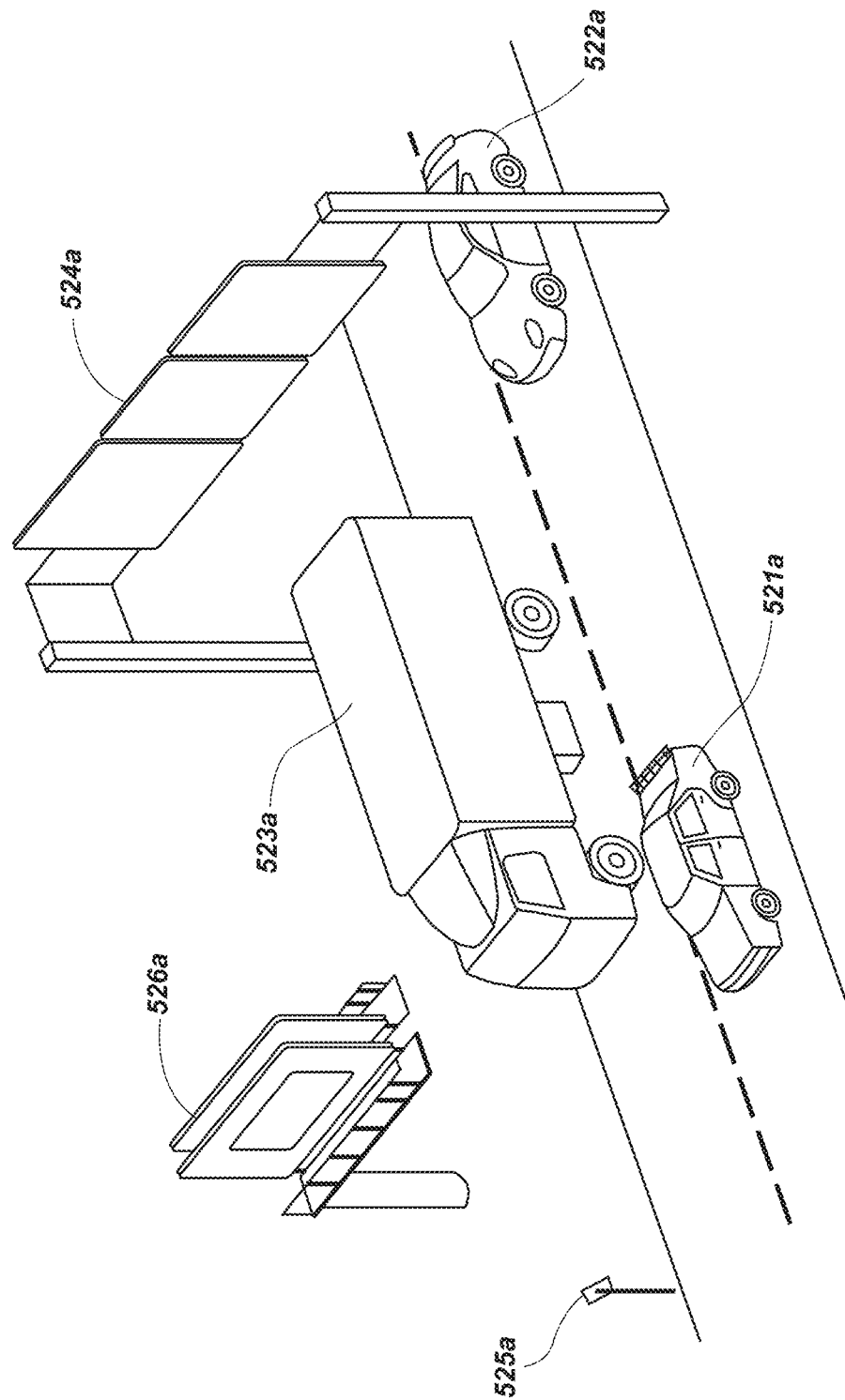
FIG. 5A illustrates a perspective view of a roadway travelled by vehicles for transmitting and/or receiving data and including signage for sending data, according to one embodiment of the present disclosure.

A more particular embodiment of an example environment for using embodiments of the present disclosure is shown in greater detail in FIG. 5A. In this particular example, advertisements, promotions, coupons, business cards, business locations, or other data may be exchanged, transmitted, or received from or by a stationary or moving object.

In particular, the embodiment shown in FIG. 5A illustrates an example highway or other roadway on which multiple vehicles 521a-523a may travel. The roadway may be managed by a federal, state, or municipal government, or may even be a private roadway. In general, the vehicles 521a-523a may move along the roadway to move passengers, property, goods, or the like between destinations. In this particular example, two passenger vehicles 521a, 522a are illustrated, and one transport vehicle 523a are illustrated. The passenger vehicles 521a, 522a may primarily move people while the transport vehicle 523a may be a delivery-type vehicle for moving goods or other property. For instance, the transport vehicle 523a may be a delivery truck associated with a courier, mail, freight, or other delivery service (e.g., USPS, FedEx, UPS, etc.). The transport vehicle 523a may also deliver other goods or products. By way of example, the transport vehicle 523a may deliver products to a grocery store, supercenter, department store, mall, gas station, or the like. In some embodiments, the transport vehicle 523a may traverse large distances to deliver products. In other embodiments, the transport vehicle 523a may travel short distances or be primarily a local-based delivery service. In still other embodiments, the transport vehicle 523a may be associated with a particular service provider. Although not limiting of the present disclosure, a plumber, electrician, heating and air conditioning, or other service provider may use a truck or vehicle similar to transport vehicle 523a to travel between local jobs to maintain a supply of equipment or parts. The passenger vehicles 521a, 522a and the transport vehicle 523a are merely illustrative of any number of types of vehicles that may be used in accordance with embodiments of the present disclosure. For instance, additional or other types of vehicles represented by the vehicles 521a-523a may include, by way of illustration only, a van, sports-utility vehicle ("SUV"), law enforcement vehicle, ambulance or EMT vehicles, fire trucks, roadside incident management vehicles, pickup trucks, motorcycles, bicycles, or other vehicles, or any combination of the foregoing.

Some or all of the vehicles 521a-523a may be used in embodiments of the present disclosure to provide or receive advertising or other data. For instance, as discussed herein, the vehicles 521a, 522a may optionally include a mobile phone, tablet PC, navigation system, camera, or other component which may receive data. Such components may be separate or integrated within the vehicle 521a, 522a. Moreover, the vehicle 521a, 522a may itself also include components for receiving, displaying, or otherwise using data 521a, 522a as discussed herein.

In at least one embodiment, the vehicle 523a—which may be a transport vehicle, service provider vehicle, or be used for other purposes—may include an advertising module (e.g., advertising module 108 of FIG. 1). Such an advertising module may be used to provide data to requesting consumers. Examples of consumers may include those drivers or passengers within the vehicles 521a, 522a.

To illustrate a manner in which data may be exchanged, a driver of vehicle 522a may have a smart phone with an integrated or downloaded application configured to receive data. The smart phone may also include a wireless radio or communication device. Using the application, the user may set the smart phone to a configuration allowing it to receive pushed communications. As the smart phone comes within range of the advertising module of the vehicle 523a, data broadcast by the advertising module may be received by the smart phone for display, audio playback, or the like. Alternatively, rather than directly receiving the information, the smart phone may instead detect that the advertising module of the vehicle 523a is within range (e.g., using a discover query). Upon detecting the availability of the advertising module 523a, the smart phone may request the data from the advertising module of the vehicle 523a.

Of course, it will be appreciated in view of the disclosure herein that the above scenarios can be modified or supplemented in any number of manners. For instance, rather than a pushed system, the smart phone could pull data. For instance, if the driver of the vehicle 522a knew that he or she needed some heating and air conditioning service at a home or office, and noticed that the vehicle 523a was for a heating and air conditioning company, the driver could turn on the application or specifically try to pull data from the advertising module of the vehicle 523a. Additionally, such actions could be taken using another type of user communication device other than a smart phone, including using the vehicle 522a itself. A driver or passenger of the vehicle 521a could also perform a similar action or receive similar data. In any case, filtered data may also be presented. For instance, if the user of the user communication device has set preferences or filters on types of data to receive, only data relevant to the filters may be presented.

FIG. 5A further illustrates an example in which signage may also be present on or near the roadway. In this particular embodiment, two road signs 524a, 525a may be adjacent the roadway. The signs 524a, 525a may generally be managed by the federal, state, municipal, or other entity who maintains or owns the roadway. They may provide various types of information, including warnings (e.g., construction ahead, etc.), distance (e.g., 323 miles to Omaha, one mile to a particular exit, etc.), information (e.g., services provided ahead, roadway merge ahead, airport on the right, etc.), or other descriptions, or some combination thereof. In general, the signs 524a, 525a may be provided to allow drivers to safely and efficiently navigate to desired locations.

In contrast, the billboard 526a may be a commercial billboard intended to primarily convey commercial, business information, although political, religious, or other information could also be displayed. In general, a company may erect the billboard 526a and then provide a commercial or other message on the billboard. Optionally, the message may change. For instance, the message may be dynamic and change regularly. Other times the message may change when replaced, such as when a billboard company leases the billboard 526a to an advertiser for a period of time.

As discussed herein, in accordance with some embodiments, the signage 524a-526a may not only include textual or other visual information, but may also include an advertising module to transmit data directly to a receiving user communication device. For instance, the sign 524a may indicate that an exit to a particular city is ahead, and potentially even indicate services available at the city. In addition to textually and visually providing some or all of that information, or in lieu thereof, an advertising module on the sign 524a may transmit the information to the mobile phone, tablet PC, or other component within or associated with the vehicle 522a. That information can then be presented to the driver or a passenger.

As an example, there may be four restaurants at the next exit from the roadway. Information on the location of each restaurant may be transmitted by the advertising module to the vehicle 522a. If the driver is interested in stopping to eat, that information may then be useful to find a desired establishment. Optionally, the information may be an address, driving directions, or even GPS coordinates. In some embodiments, the information may include descriptions of the restaurants, including types of food, daily specials, current wait time, and the like. Coupons, awards and recognitions, and the like could also be presented. Of course, other types of businesses could also have their information provided. Examples may include gas stations, hotels, and the like. In some embodiments, the information received may be based on user preferences as discussed herein. In some embodiments, the information relevant data could be dynamically determined or automatically determined. If, for instance, the vehicle has less than a quarter tank of fuel, the vehicle could set a filter to allow information on gas stations. If it is after 8:00 pm and more than one hundred miles from a home location, a filter could also allow information on hotels. Of course, other automated, dynamic, manually chosen, or other filters may also be used. Moreover, the information provided need not be strictly commercial. Cities or other municipalities could also provide other information for transmission by their signage (e.g., locations of tourist sites, hospital locations, traffic information, and the like).

Advertising modules associated with the signage 524a-526a may thus operate in a manner very similar to that of a mobile advertising module on the vehicle 523a. Transmitted data may include all types of business information, and may pushed or may be pulled. For instance, upon seeing the billboard 526a, a passenger in the vehicle 522a may be interested and request more information, at which time communication can be received to provide location, service, promotional, discount, or other information to the vehicle 522a.

Transmitted data may be considered, in general, to be an enhanced promotional or other service of the signage 522a-526a. The advertising may be enhanced because additional information can be provided beyond that simply conveyed visually by the sign itself. Moreover, enhanced services may be provided to allow tracking of effectiveness of promotional materials. For instance, the rental rates for signage 526a may be in part based on the amount of traffic passing by the location on the adjacent roadway. An advertising module may, however, also be able to keep track of additional information such as the number of times a pull request is made, the number of total times the data is wirelessly transmitted, and the like. The effectiveness of signage, or the value of a particular location, may therefore be more completely determined by seeing what percentage of total passers-by request or allow additional information. Thus, a roadway where 15,000 drivers pass by daily, and in which 30% request or receive more information may in the end be more valuable than a roadway where 100,000 drivers pass by daily but where only 2% request more information. Of course, similar analysis can be provided by an advertising module on the vehicle 523a as well. Whether an advertising module is on a vehicle 523a, signage 524a-526a, or in some other location, the costs associated with renting the module, or hosting third party content, may be implemented using transaction-based, subscription-based, or other models.

Figure 5B:
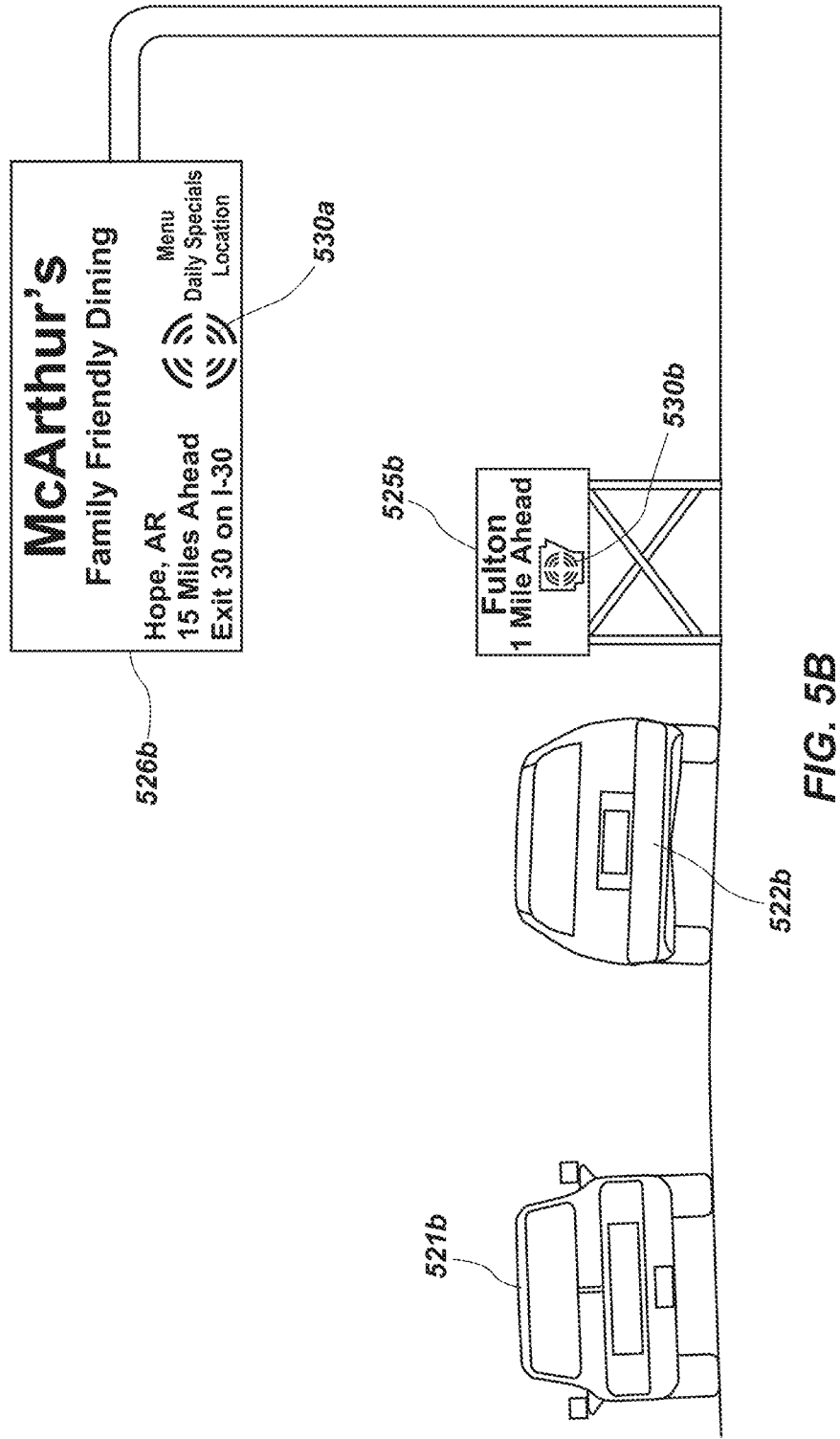
FIG. 5B illustrates a frontal view of another example roadway travelled by vehicles for transmitting and/or receiving data, and which includes signage for sending data, according to one embodiment of the present disclosure.

FIG. 5B illustrates another example roadway on which multiple vehicles 521b, 522b may travel, and on which data may be transferred. The roadway of FIG. 5B may be used to transfer data in manners identical or similar to those described previously with respect to FIG. 5A. Thus, the vehicles 521b, 522b may be any of a number of different types of vehicles, including passenger vehicles, commercial vehicles, emergency vehicles, and the like.

In FIG. 5B, the two vehicles 521a, 521b may pass in opposite directions on the roadway. Along the roadway there may be signage 525b, 526b of any of different types. In this particular example, a billboard 526b may be adjacent the roadway and can advertise any of a number of different products, services, or the like. A road sign 525b may also be adjacent the roadway. In this particular example, the road sign 525b may provide information such as an indication that a particular town or exit is ahead. Other example road signs 525b may include signs indicating events or conditions such as, but not limited to, a road merge, a road divide, an exit, distance to specific locations, construction indicator, warnings, road name/number, mile marker, stop or yield signs, speed limits, services ahead (e.g., food, lodging, fuel, hospital/medical, hiking trails, restrooms, etc.), or other information, or any combination of the foregoing.

Regardless of the particular text, images, or other information on a sign 525b, or the particular goods, services, or the like advertised on the billboard 526b, and regardless of whether provided by a commercial, governmental, or other entity, an advertising module may be located on, or near, the sign 525b, 526b to provide data in a wireless manner. For instance, as the vehicle 522b passes the billboard 526b, the driver or a passenger may want to obtain more information about the business, and can specifically request information. A user communication device could be set, for instance, to pull data from an advertising module of the billboard 526b. A user could also have the device in a push-mode where data can be pushed to the user communication device. In some embodiments, the billboard 526b may provide an indication that wireless, data is available. FIG. 5B, for instance, shows an example icon 530a. Optionally, a specific icon 530a (or set of one or more icons) may be associated with an application or service which provides wireless data. Accordingly, when the icon 530a is viewed, a user may know that data can be received. Text or other indicators may also, or alternatively, be provided. FIG. 5B, for instance, may indicates that data, such as a menu, daily specials, and location information, can be obtained wirelessly from the billboard 526b. In other embodiments, text may simply indicate that additional information is available, and may be used with or without the icon 530a.

The road sign 525b may operate in a similar manner. In FIG. 5B, the road sign 525b may be a local, state, or federally provided sign 525b that indicates that a particular location (e.g., city, landmark, etc.) is ahead. The sign 525b could, however, be any other type of signage found along a roadway. In this particular embodiment, the sign 525b also includes an icon 530b that may indicate that data is available via wireless transmission. The icon 530b may, but need not necessarily, be the same as, or similar to, the icon 530a on the billboard 526b. In this particular embodiment, the icon 530b may be associated with an additional image (e.g., the shape of the state of Arkansas) to indicate that the information is administered or provided by a particular entity. Text optionally accompanies the icon 530b, and in this embodiment indicates that information on goods/services including but not limited to food, lodging, medical services, recreational facilities, and auto repair may be available through an advertising module associated with the sign 525b.

In some embodiments, the data provided by the signs 525b, 526b may be sent to any or all vehicles 521b, 522b, or user communication device, with supportive capabilities. In one embodiment, only vehicle 522b may be heading in a direction where the signs 526b, 525b are visible, and thus only vehicle 522b may receive the transmitted data. In other embodiments, both vehicles 521b, 522b may receive the transmitted data. In other embodiments, a user communication device may set a filter or other setting to limit data to that in a direction of travel. In such an embodiment, since vehicle 521b may be heading away from the signs 525b, 526b such that the text is not visible (and/or away from businesses or other entities associated with transmitted data), the vehicle 521b, or a user communication device therein, may restrict the data from being transmitted. The data may be received and then deleted when not satisfying a particular filter, or the vehicle 521b or associated user communication device may transmit a signal that includes or identifies filters so that data may not even be received.

In at least some embodiments, one or more of the vehicles 521b, 522b may also be used to update data at the signs 525b, 526b. For instance, a transmitter may be provided on the vehicle 521b, and data may be stored thereon. When the vehicle 521b drives past the billboard 526b and/or the road sign 525b, the transmitter may contact the advertising module, authenticate itself, and send updated data. The updated data may then be the data sent by the billboard 526b and/or road sign 525b to vehicle 522b or other user communication devices. Thus, data may be updated in a mobile manner.

As discussed herein, there may be a number of different types of signage used in transmitting data according to embodiments of the present disclosure. Such signage may include, for instance, commercial signage such as billboards erected by a company advertising on the billboard, or by a third party advertiser who rents the billboard space to an advertiser. In either case, an advertising module may be included to transmit data of one or more entities. Signage may also be wholly or partially administered by a governmental entity (e.g., federal, state, local, etc.). FIGS. 5C-5H, for instance, illustrate various non-limiting examples of governmental road signs that may be used in connection with embodiments of the present disclosure.

Figure 5C:
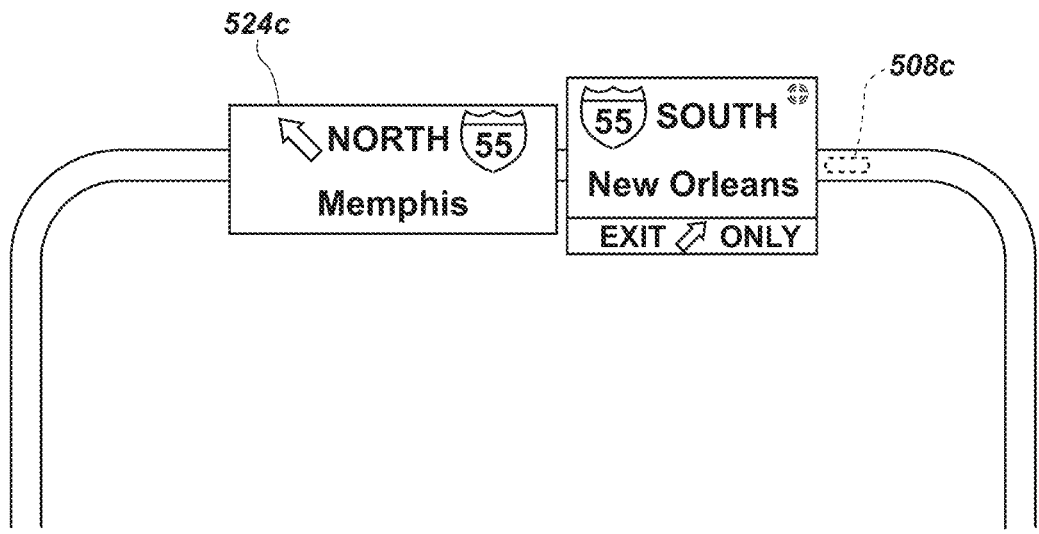
Figure 5D:
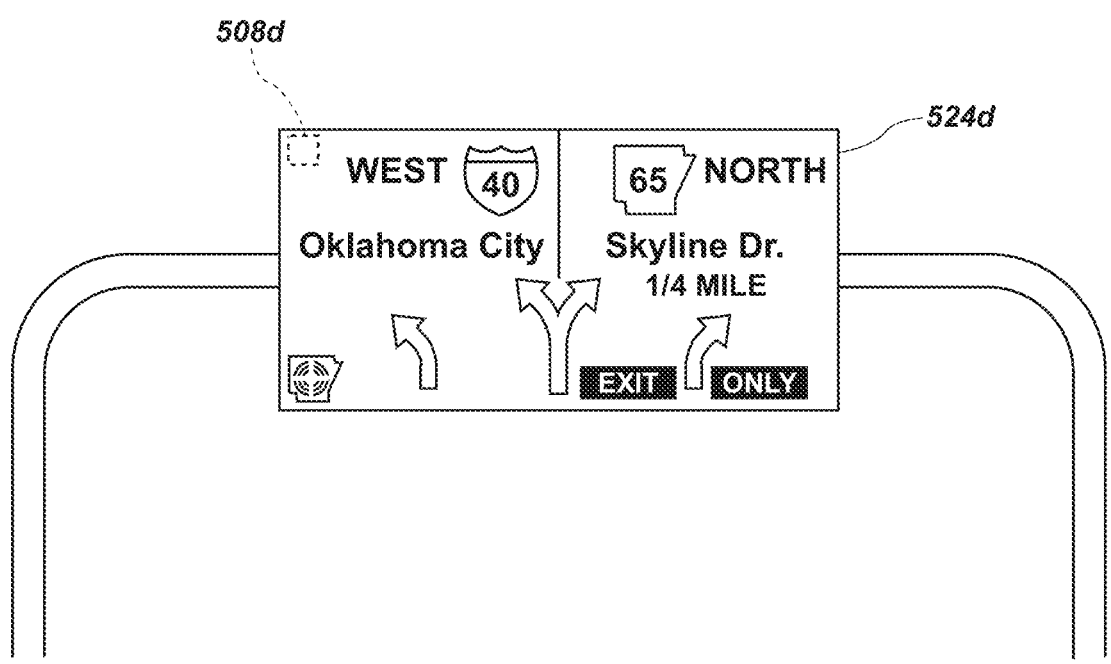

In particular, FIGS. 5C and 5D may illustrate over-head road-signs 524c, 524d of a type that may be located above a roadway. As a vehicle approaches and passes under the signs 524c, 524d, the user may read or view information relevant to traversing the roadways. FIGS. 5C and 5D, for instance, illustrates that a roadway may have multiple lanes that divide to go different routes. Optionally, the signage 524c, 524d may also include advertising modules 508c, 508d. Such modules may provide relevant business information as discussed herein. Example information may include information on businesses, events, recreational areas, historical sites, etc. at a location mentioned on the signs 524c, 524d, at a nearby location, or some other location, or any combination of the foregoing.

Figure 5F:
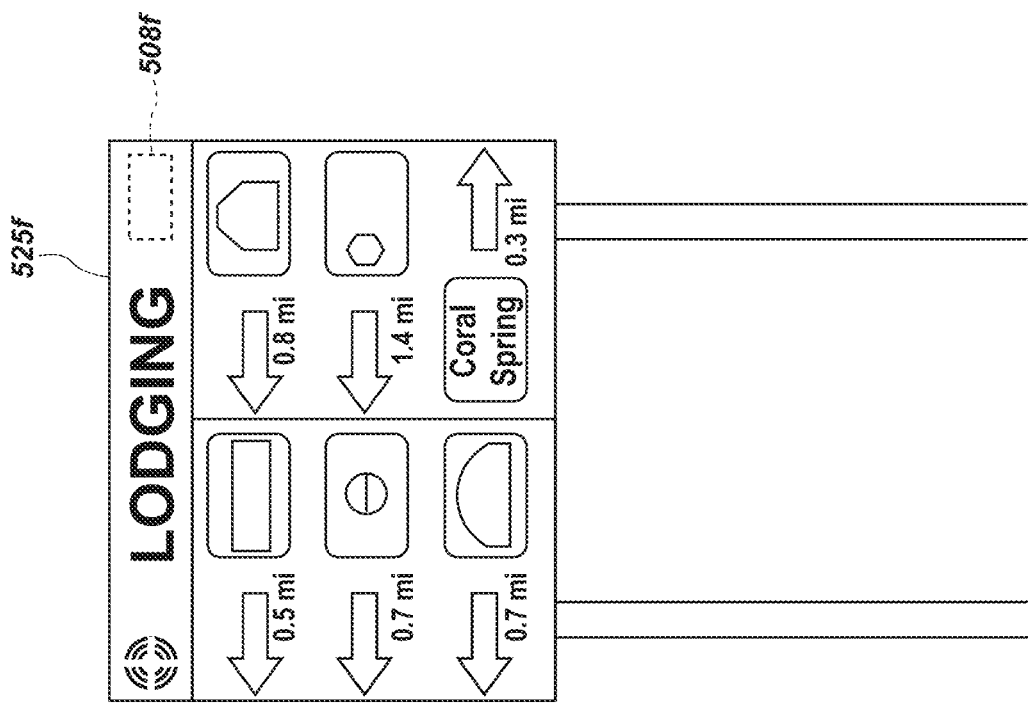
Figure 5E:
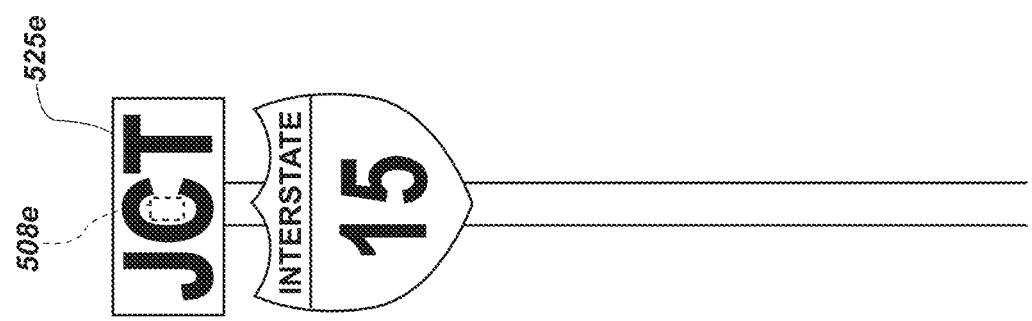

FIG. 5E illustrates still another embodiment of a sign 525e that may be adjacent a roadway. In this particular example, the sign 525e indicates what road is being traversed, and further indicates that two roads are joining. Optionally, an advertising module 525e may also be present to transmit data to passers-by and provide information on nearby businesses, events, and the like.

FIGS. 5F-5H are further examples of road signs 525f-525h that may be adjacent a highway. The illustrated signs 525f-525h depict signs which may be administered or maintained by a governmental agency, and which also provide commercial information. In particular, sign 525f of FIG. 5F provides information on nearby lodging, sign 525g of FIG. 5G provides information on nearby food and lodging, and sign 525h of FIG. 5H provides information on nearby fueling and camping locations. In some embodiments, such information on various businesses or other locations may be provided in text and/or images. Example information may include a name or logo of a business, a distance to the location, the direction to travel to reach the location, a category of a business or other location, and the like. In addition to, or instead of, providing textual/visual descriptions of how to reach certain locations or businesses, an advertising module 508f-508h may be included with any sign 525f-525h. The advertising modules 508f-508h may transmit information as discussed herein. Example information may include data about a location, including the name, location (e.g., address, GPS coordinates, etc.), promotional materials, menu, hours of operation, coupons, daily specials, and the like. As discussed herein, some data transmitted by the advertising modules 508c-508h of FIGS. 5C-5H may be third party information. In particular, one party owning or maintaining a sign may sell advertising to other parties. FIGS. 5C-5H may, for instance, be owned and/or maintained by a governmental entity and space can be rented to various businesses. Such rental may be on a transaction, subscription, or other basis as discussed herein, or as appreciated in view of the disclosure herein. Further, as discussed herein, the various signs of FIGS. 5C-5H may or may not include a textual, graphic, or other indicator that an advertising module and/or data is available. Some signs, including those in FIGS. 5C, 5D and 5F-5H may include, for instance, an icon indicative of the availability of wirelessly transmitted data.

Figure 6:
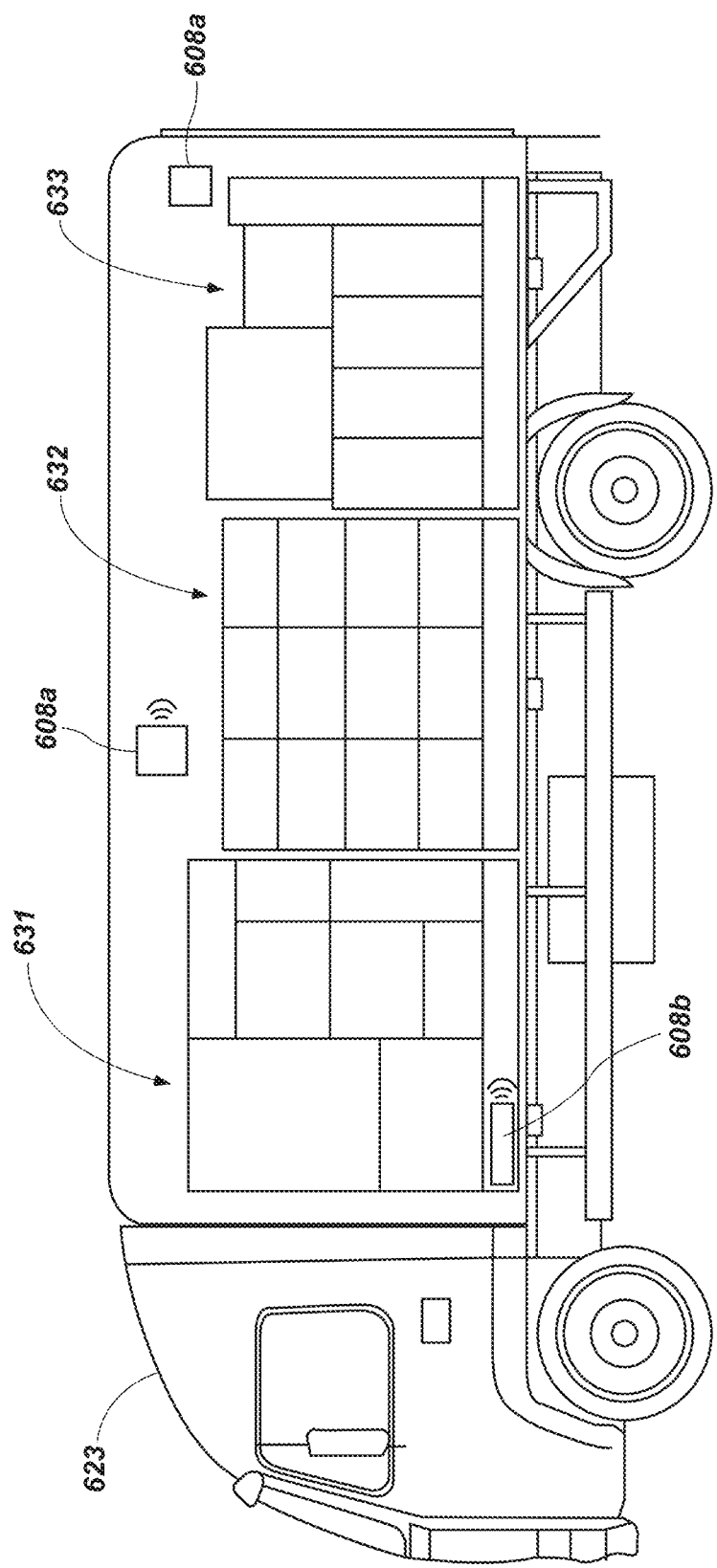
FIG. 6 illustrates a side view of an interior of an example transport vehicle having an advertising module for sending data, and having one or more shipping cartons with its own advertising module, according to one embodiment of the present disclosure.

Turning now to FIG. 6, a side view of a vehicle 623 is illustrated. The vehicle 623 may or may not be similar to the vehicle 523a of FIG. 5A in some embodiments. In this particular embodiment, the interior of the vehicle 623 is exposed to show that various cartons 631-633 of goods are stored in the vehicle 623. Such goods may be en route to delivery to one or more destination locations. In this particular embodiment, the vehicle 623 may also include an advertising module 608a. The advertising module 608a may act in a manner similar to that described herein, and can include one or more different types of business information for one or more businesses. In one embodiment, the business operating the vehicle 623 may include its business information to advertise itself as the vehicle 623 moves down a roadway. In other embodiments, the advertising module may include business information for the goods it transports. In still other embodiments, the advertising module 608a may include business information for third parties.

As an example, the vehicle 623 may be owned and operated by a particular company (e.g., WALMART™, COSTCO™, FED EX™, etc).

The vehicle 623 may include vehicle wraps, paint, or other information on the exterior to identify itself as corresponding to a particular company. Advertising information in the advertising module 608a may also include information relevant to the company. For instance, destination, location information, current specials, coupons, jobs/employment opportunities and the like may be broadcast or otherwise sent by the advertising module 608a and picked up by nearby consumers who either request information, or who receive relevant information through their vehicle or user communication device (optionally based on filters to get relevant information). In some embodiments, the information may include the products inside. Thus, if a consumer is interested in purchasing fresh produce, and the advertising module 608a sends information about the vehicle 623 containing produce, the consumer may stop where the vehicle 623 is making a delivery or where it advertises that it is going.

The advertising module 608a may also be opened up to advertise specific brands, or even third parties. For instance, if a WALMART™ branded truck is going down the highway, the brand name recognition may be valuable to trigger consumers to request or otherwise obtain data. A bank or convention center, for example, may recognize the value of that brand, and pay or otherwise request to have its data also included on the advertising module 608a. Stated another way, a third party business (e.g., a bank) may "piggyback" on an advertising module owned and/or operated by another business (e.g., WALMART™).

The advertising module 608a may then send business information for multiple types of businesses, and can provide a secondary revenue stream for the operator of the vehicle 623. A commercialization module may be included on a computing device, or on the advertising module 608a itself, to determine the value of the advertising for third parties. An example commercialization module may, for instance, determine volume of consumer traffic, as discussed herein, as part of determining a cost to a third party for piggybacking advertising on the advertising module 608a (or in allowing or using the advertising module 608b discussed below).

Various non-limiting examples of third party advertising will now be described. As one example, a pharmaceutical company, which has a new drug just approved for heart monitoring, may advertise their drug by "piggybacking" off of one or more sensors of a delivery transportation warehouse vehicle of another company (e.g., a retail corporation, such as WALMART™). The advertisement may convey that that new drug can be purchased at a nearby location of the retail corporation (e.g., at the neighborhood WALMART™). Accordingly, in this example, a pharmaceutical manufacturer of a new drug may advertise relevant information about the new drug via a third party including where to purchase the new drug.

As another example, a real estate company can advertise a new community development it is building via "piggybacking" a HOME DEPOT™ vehicle located and traveling within that immediate community. In this example, the HOME DEPOT™ vehicle may also convey information regarding their products and/or services and thus, gets the added value benefit of allowing potential buyers within this new development to learn of their resources, promotions, and/or locations. Further, HOME DEPOT™ could also advertise information regarding informational seminars available to the general public of how to fix or install some product.

As yet another example, VERIZON™ can advertise a device (e.g., SAMSUNG™ or APPLE™ phone) via a warehouse (e.g., COSTCO™ or BEST BUY™) delivery vehicle and announce the ability to purchase the device at the warehouse. The warehouse (e.g., COSTCO™ or BEST BUY™) receives the added value of getting the customer into their store to purchase the advertised product, as well as having a captured audience that will have the opportunity to purchase other items within their store.

According to other examples, local school activities (e.g., fundraisers, sporting events, stage performances, etc.) can be advertised by, for example, local retail establishment vehicles, school or city buses, within the local community for the school. Further, pay-tolls (e.g., State Department of Transportation pay-tolls) at certain exits and entrances of highways, participating in various advertising campaigns for businesses, tourism, informational alerts, and other venues, may be able to monetize these advertising campaigns to generate additional revenue for the federal, state, and/or local governments.

In addition, similar to buses, which can display the bus route (e.g., on the front of the bus) for the general public to see before boarding when the buses reach certain locations, vehicles, according to various embodiments, may be configured to display and update advertisements as these vehicles pass certain crossroads within the GPS highways locations. In this example, an advertiser may pay for only certain miles traveled where their advertisement would be relevant for certain geographical location/areas only as the position of the vehicle changes.

In other embodiments, producers or distributors of products may opt to include their own advertising modules within a vehicle 623. As shown in FIG. 6, for instance, the carton 631 may include its own advertising module 608b. As the vehicle 623 moves down a roadway and to a destination, the advertising module 608b may itself transmit data to advertise products or services. In some embodiments, the advertising module 608b may be a low cost module that can be discarded upon delivery, although in other embodiments the advertising module 608b may be reusable to allow multiple trips. The advertising module 608b may itself be located within a pallet, carton, package, or other item that is delivered from one location to the next. In some embodiments, the advertising modules 608a, 608b may communicate with each other. For instance, if the advertising module 608a has a larger range, the advertising module 608b may send information to the advertising module 608a, which can then distribute the information over larger geographical areas. FIG. 6 is merely illustrative, and should not be interpreted as being limiting of the present disclosure. For instance, rather than a transport vehicle, the vehicle 623 may include any other type of vehicle which would be appreciated by a person having ordinary skill in the art in view of the disclosure herein (e.g., passenger vehicles, emergency vehicles, motorcycles, trucks, vans, SUVs, ATV's, boat(s), plane(s), train(s), etc.).

As noted above, one advertising medium may include a living being, such as a human, In this embodiment, which may be referred to herein as a "human factor" or a "human element", a living being (e.g., a human being) may utilize one or more advertising modules. The advertising modules may include sensors, including, but not limited to, wearable sensors (e.g., wrist-based sensors), implanted sensors/monitors, skin patches, clip-on sensors, domes, digestible pill-based sensors, and clothing-based sensors. The advertising medium may also include one or more transmitters and possibly one or more receivers. As will be appreciated by a person having ordinary skill in the art, this embodiment may provide a "walking billboard" capable of advertising through a multitude of advertising campaigns. It is noted that the utilized sensors may be visibly recognizable (i.e., to target audiences), or the sensors could be hidden.

As an example of a human element embodiment, a living being may walk within a community while streaming data of local restaurants and lodging at/or within the vicinity. As a more specific example, an individual may walk within a community near a national park, a state park, monument, etc. while streaming data of local restaurants and lodging as locals and/or tourists are near the national park, state park, monument, etc. As another example, a living being (e.g., a retail store employee) moving about a shopping center (e.g., a shopping mall or a strip mall) and utilizing one or more advertising modules may electronically advertise (i.e., for the retail store, and any third party) to patrons within or proximate to the shopping center.

Although various embodiments of the present disclosure, as described herein, use one or more advertising modules, the present invention is not so limited. Rather, a vehicle (e.g., vehicle 521*a*) may also receive information via another source (e.g., a cellular tower or a satellite). As a more specific example, destination unit (e.g., a vehicle, or a mobile phone, tablet PC, navigation system, camera, or other component) may receive information from a cellular tower or satellite, wherein the type of information received may be based on a location of the destination unit. Yet, even more specifically, a mobile phone may receive information, via for example cellular or satellite communication, about restaurants and services stations proximate an exit of a highway while the mobile phone is within a certain distance of the exit. It is noted that location-based information may be transmitted based on, for example, specific, collective, and/or random GPS coordinate(s).

Figure 9:
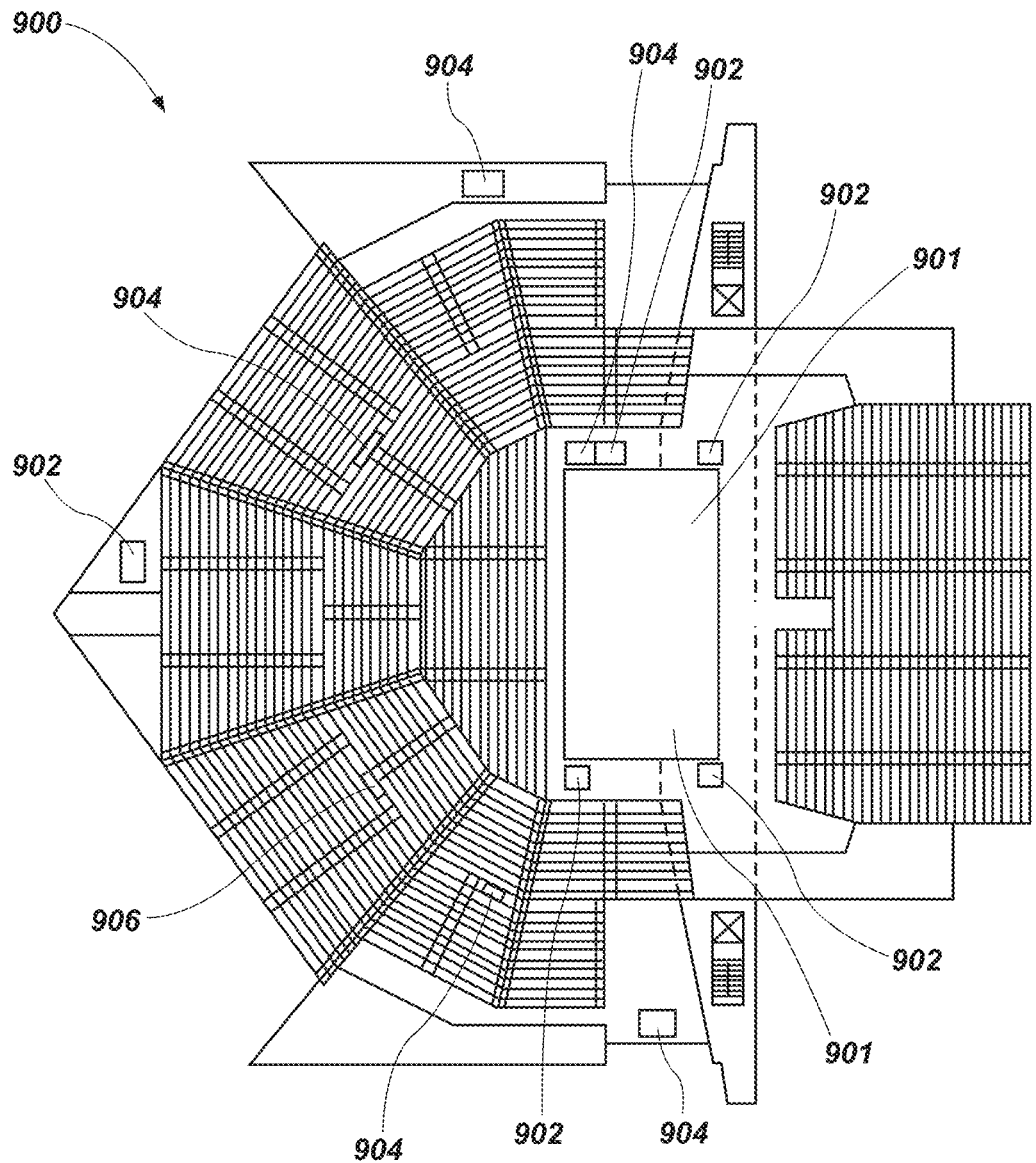
FIG. 9 illustrates a performance venue including one or more sensors and one or more advertising modules, in accordance with an embodiment of the present disclosure.

With reference to FIG. 9, an example of a human element (HE) embodiment will now be discussed. In this example, an end-user (i.e., a patron) 906, proximate, or within a performance venue 900 (e.g., a sports stadium, a concert venue, auditorium, theatre, etc.), may receive relevant information about the venue (e.g., location of bathrooms, exits, seating, food concessions, etc.) as well as any information about an event (e.g., a concert, a sporting event, or any other performance at the venue). As will be appreciated by a person having ordinary skill in the art, a venue (i.e., performance venue 900) may include a platform 901 (e.g., a court, a field, a stage, or any other performance platform), one or more sensors 902 (e.g., cameras, video recorders, audio recorders, and the like) positioned within and/or proximate to the venue for capturing data related to an event. Further, one or more advertising modules 904 (which may also be referred to herein as beacons) may be positioned within and/or proximate to the venue for generating and conveying data or any other information related to the venue or an event at the venue. For example, the advertising modules may generate data based on the captured data, and convey the generated data to one or more user communication devices.

According to one specific embodiment, an end-user 906 may (e.g., at anytime during the event) receive personalized data (i.e., data generated by an advertising module), which may include a photo, a video, audio, or any combination thereof. More specifically, for example, the end-user 906 may receive a photo of a performer (e.g., their favorite player, a team photo, or a musical rock star), and/or a photo of the user and the performer together, thus personalizing an experience for the end-user. According to one embodiment, the photo may be personalized (e.g., addressed to the end-user and signed by the performer) and the date, time and location may be included on the photo to authenticate the actual attendance of the end-user. As a more specific example, the photo may include a photo and/or a video of a "special moment" such as, an end-user's favorite player scoring a goal, touchdown, getting a base hit, or a musician doing something noteworthy that the end-user wants memorialized (e.g., singing of their favorite song, a certain costume was worn, special effects background that resonated to them, etc.). The end-user may receive the "special moment' as a photo, signed by their favorite performer, a video, an audio file, or any combination thereof. Further, the photo may include a validation of attendance (e.g., date, time of specific moment, GPS coordinate(s) of that moment of that event) defined on the memento received by the end user.

Various human element embodiments of the present disclosure may enable an individual to attend an event, and not only be entertained, but the individual can personally dictate what moments of the event should be memorialized and/or personalized. The individual can tout their photo op through various social media platforms, easily validating the proof of their experience, by having stamped on that photo, the date, time, GPS coordinates for location, and defining the event. All contact information, payment sources, etc. may be accessible via the individual's user communication device, making the process simple and quick. In the past, cards identifying ballplayers were prevalent, and people collected them. This embodiment may enable an individual to hypothetically engage as many performances, venues, and/or events etc., either on an iconic platform of performers or down to your local community sport teams, and collect photos of specific performances or other engagements. An end-user may keep these photos as a log of chronological events in their lives as a photo album.

Figure 10:
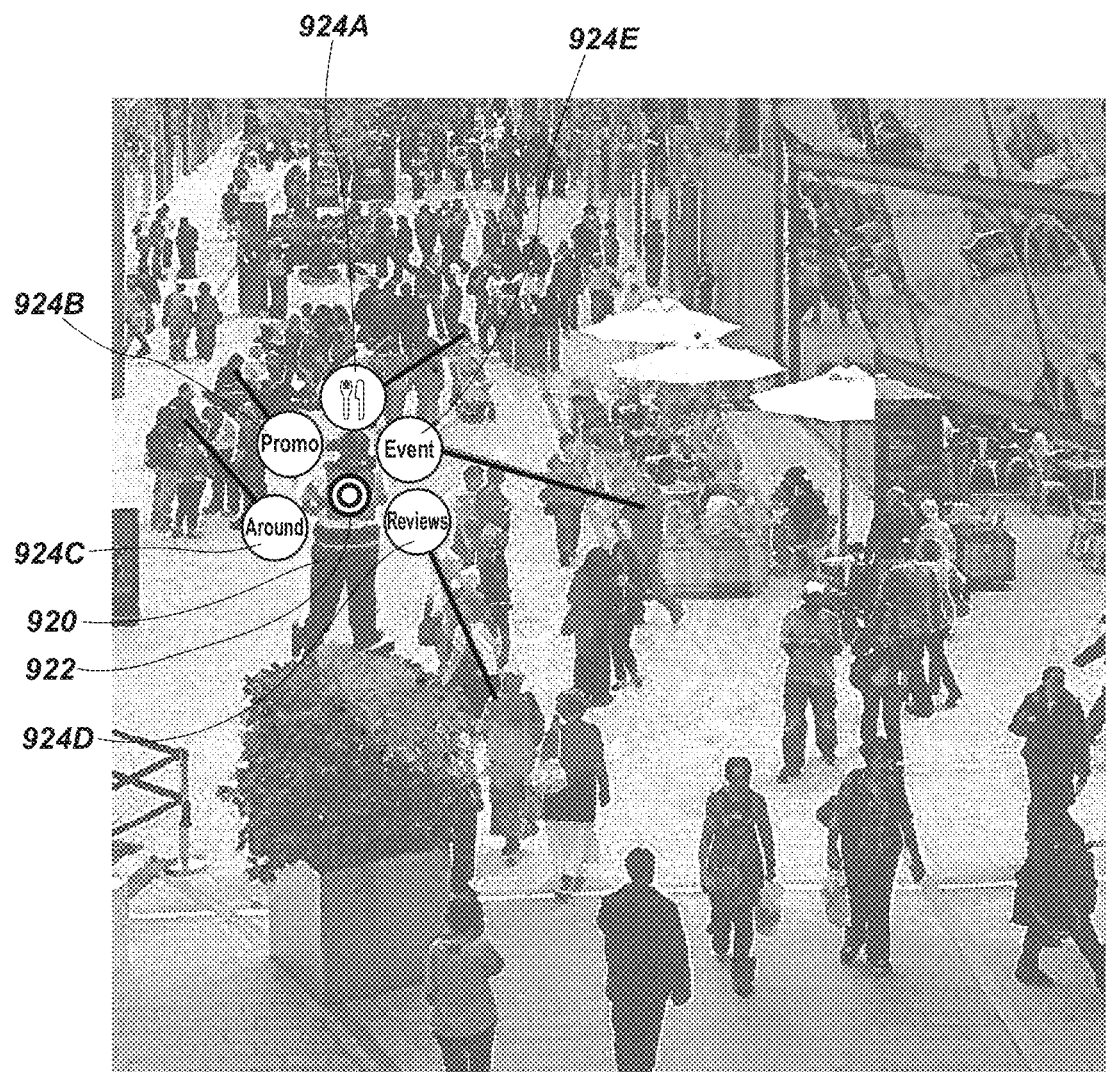
FIG. 10 illustrates an augmented reality based system, according to one embodiment of the present disclosure.

According to various embodiments of the present disclosure, AR may be utilized within a system for providing information (i.e., data) to an end-user. FIG. 10, which depicts an example augmented reality system, illustrates an individual 920 associated with various virtual components, which identify individual 920 as an information source. AR graphics may be generated by any suitable method known in the art. It is noted that various virtual components may be used to identify an information source (e.g., a human being) and types of available information. For example, a virtual "bulls eye" component 922 may be generated proximate individual 920 and may be visible to others within the vicinity of individual 920. Regardless of the type of virtual component used, some easily recognizable component (e.g., a logo), which may be universally accepted, may help others to identify and receive information from an information source as a jacket and/or some other garment or other identification measure and/or device on an individual. Further, FIG. 10 includes virtual components 924A-E, which appear proximate individual 920 and identify types of information that may be obtainable. In this example, a plurality of augmented reality categories are illustrated by virtual components 924A-E. More specifically, a virtual component 924A, which is a depiction of a "knife & fork", is used to convey that information related to area dining options is available. Further, virtual components 924B, 924C, 924E, and 924E respectively displaying the words "Promo", "Around", "Reviews", and "Event" are used to convey that related information is available. It is noted that, according to one example, individual 920 may be a hired individual (e.g., a shopping center employee) moving about an area (e.g., a shopping center) and displaying virtual components, and, end-user selection, conveying information (i.e., via the virtual components) related to the area and/or data for one or more retail stores within the area.

As will be understood, when virtual components are displayed (e.g., pop-up), interested parties may point a device (e.g., a smart device) at selected a virtual component and receive relevant information about anything from promotions to restaurants etc. For example, a user may point their smart device at a virtual component including the text "Promo" and, thereafter, receive information via their smart device related to promotions within the area. It is noted that AR and advertisement scenarios based on AR may be implemented via any required applications (e.g., user device applications, web application, and/or Cloud applications). AR related based advertisements may provide a new form of engagement and may allow an end-user to personally control their own advertising experience.

Figure 7:
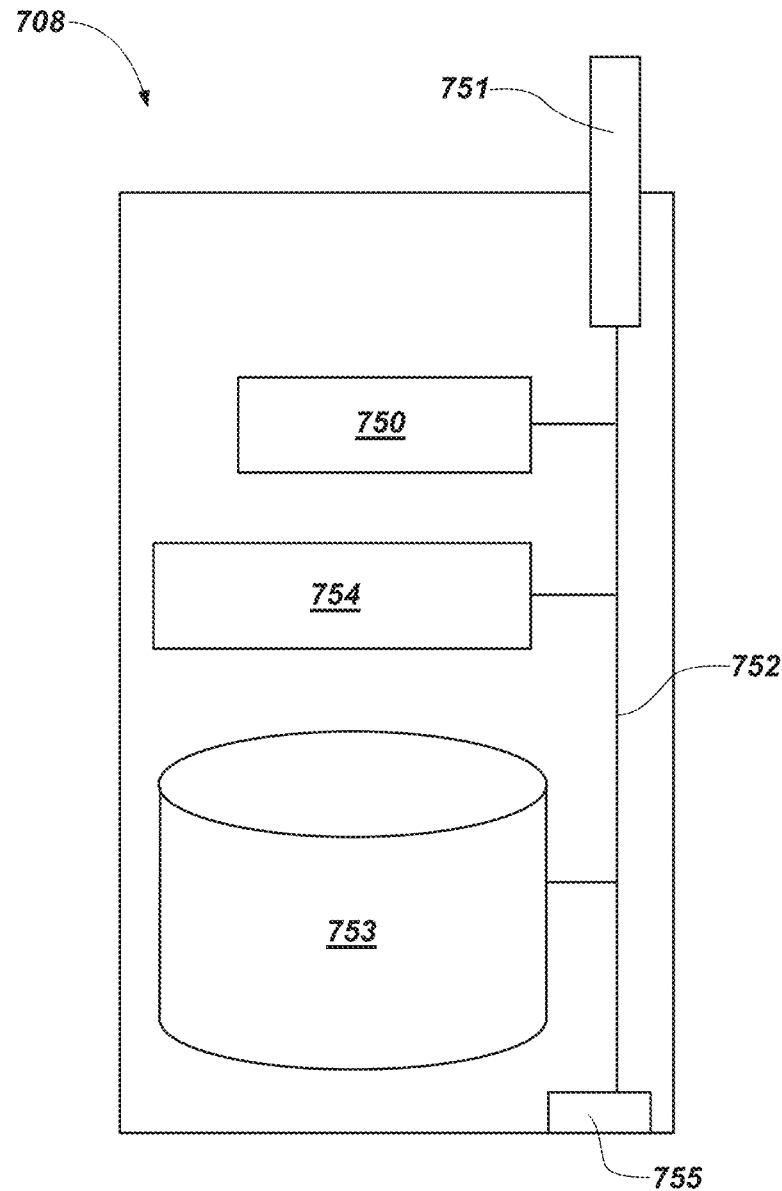
FIG. 7 schematically illustrates an example advertising module, according to one embodiment of the present disclosure.

A particular example of one type of an advertising module 708 is illustrated in additional detail in FIG. 7. The illustrated advertising module 708 may be used in any type of environment or system disclosed herein, or which may be learned by one skilled in the art in view of the disclosure herein. The advertising module 708 is, however, merely illustrative and may be varied in any number of manners.

In this particular embodiment, the advertising module 708 includes a radio component 750. The radio component 750 may generally include a transmitter, receiver, transceiver, or other component to allow data to be communicated to, or sent from, the advertising module 708. The radio 750 is one example of a wireless network interface component. In one embodiment, the radio component 750 may be configured to format and send wireless data according to any suitable wireless protocol, including, but not limited to, those specifically discussed herein. To facilitate transmission of such data, the advertising module 708 may also include an antenna 751 linked to the radio 750. In this particular embodiment, the advertising module 708 is shown as including a communication bus 752 which may link the radio 750 to the antenna 751. In other embodiments, other types of communication may be used, or the antenna 751 may be integrated as part of the radio 750.

The illustrated embodiment of an advertising module 708 is further shown as including data storage 753. The data storage 753 may be used to store any number of types of programs, data, or other information. For instance, the data storage 753 may store data. Examples of data may include advertisements, promotions, business cards, coupons, reviews, locations, and the like for a particular business, product, or service. Of course, other types of business information may also be provided. In general, the radio 750 may be connected to the data store 753 (e.g., using the bus 752) to allow data stored in the data store 753 to be transmitted via the radio 750 and/or antenna 751. Data in the data store 753 may be specific to one business, product, or the like, or may include information for multiple businesses, products, etc.

Optionally, a processor 754 may also be provided. The processor 754 may be used to execute requests for data and/or to determine what data should be sent from the data store 753. In some embodiments, the data store 753 may include programs executed by the processor 754. An example program may be used to filter which information is transmitted by the radio 750. If, for instance, a request is received by the radio 750, and the request specifies certain types of desired data, the processor 754 may execute an application to determine which data in the data store 753 is relevant, and then send that information to the radio 750. In other embodiments, the format of the data may vary based on the requesting device, and the processor 754 may be used to find or produce the data in the desired format.

An additional component 755 is further shown in the advertising module 708. The illustrated component 755 may have any number of purposes. For instance, the component 755 may include a power component for supplying power to the processor 754, radio 750, etc. An example power component may include an independent power supply such as a battery. In other embodiments, a power supply may be dependent. An example dependent power supply may include a wired connection which connects to an outlet or other power source. In other embodiments, the component 755 may have additional or other functions. For instance, the component 755 may include a port for updating information on the advertising module 708. Updates may be provided to add or remove business and other advertising data on the data store 753, update firmware for the radio 750 or other components, or for other purposes. A port may also be used to charge a rechargeable power supply in some embodiments.

As should be appreciated by a person having ordinary skill in the art in view of the disclosure herein, embodiments of the present disclosure may include a variety of features and components, and may be used in a variety of systems. In accordance with one embodiment, methods, systems, devices, applications, software, computer-readable media and the like may be used in connection with an advertising system. According to at least one non-limiting embodiment, the advertising system may be dedicated primarily to advertising. For instance, the advertising module 708 may be intended to provide primarily advertising information. Thus, advertising information may be received without bogging the module with other types of information. In the context of a moving system where advertising and other business information is received from a moving vehicle, or while in a moving vehicle, traffic, weather, or other information could potentially be limited, if not eliminated entirely. Instead, an advertising module may primarily send only advertising and data. Similarly, a receiving application by a consumer may be dedicated for primarily advertising use, if not solely for that use.

Figure 8:
FIG. 8 illustrates an example user communication device executing an application for receiving data from one or more advertising mediums, according to one embodiment of the present disclosure.

FIG. 8, for instance, illustrates an example mobile phone 802 that is an example of a user communication device. The mobile phone 802 is shown as displaying an interface associated with an advertising application. As shown in this particular embodiment, all messages may be advertising related. Four messages are currently shown but additional messages may be obtained. In addition, user preferences or settings, message filters, or saved messages may also be accessed, although such features are merely illustrative. Moreover, as shown in FIG. 8, advertising messages may include different types of information, including coupons, or mere advertising or slogans. Optionally, contact information, GPS coordinates, or the like may also be transmitted.

While FIG. 8 illustrates one example of a user interface usable in connection with a mobile phone 802 or other device in accordance with some embodiments of the present disclosure, other embodiments may contemplate alternative or additional features. For instance, the advertising application may present an interface with any of various sections to allow a user to view (or filter) different types of notifications and data. As an example, different sections or filters may be provided for tourism (e.g., state, local, etc.), hospital/emergency, music/art events (e.g., concerts, museum limited showing, etc.), or other categories. Such categories may be used to receive data from private businesses, state, federal, or municipal governments, or other entities, or any combination of the foregoing.

As also discussed herein, advertisements and other data transmitted by an advertising module and received by a user communication device may be relevant to the consumer. Such relevance may be in terms of content, geography, or other criteria, or any combination of the foregoing. A consumer may, for instance, only want coupons, or even coupons with savings over a particular dollar value. Any advertisement not meeting those criteria may be deemed irrelevant, and may be blocked from the user receiving them. Similarly, a consumer may only want advertisements relating to a particular product or service. Any other advertisement or business information may be irrelevant. A consumer may also only want advertisements for businesses within a particular geographic region, and anything outside that region may be irrelevant. A geographic region may be fixed, or may dynamically change based on, for instance, a current location.

Geographic information may also be used in other manners. For instance, data may be obtained in a proximity basis, on the then current location. Such data gathering may not rely wholly, or in part, on any business being in a specified geographic region. Rather, if an advertising module is within range so as to directly send information to the user communication device, the data may be sent and received (e.g., vehicle-to-vehicle, sign-to-vehicle, etc.). In some embodiments geographic, content, or other filters may nonetheless also be applied to limit the advertising data. Accordingly, unlike embodiments in which a central server may send data fitting particular geographic requirements, some embodiments contemplate direct, point-to-point communication. Although such information could also be sent along multiple hops (i.e., using multiple intermediate devices between a transmitter and receiver), other embodiments contemplate specific end destination and transmission locations being within range of each other for data to be transmitted.

The mobile phone 802 is merely illustrative of a number of user communication devices, and can also include any number of features. For instance, the mobile phone 802 could be replaced, supplemented, or used in connection with other electronic devices, such as a navigation system, tablet computing device, laptop, netbook, or the like. In some embodiments, the mobile phone 802 or other user device may include other components, including, such as processors, displays, radios or network interfaces, memory, data storage, communication interfaces, input/output devices, or the like to facilitate operation.

Embodiments of the present disclosure may be expanded to include any number of additional or alternative features. For instance, racing vehicles (e.g., Formula One, stock car, rally, drag, touring, kart, off-road, etc.) may include different advertisements on the exterior thereof. In some embodiments, an advertising module may be included on the racing vehicle. The advertising module may include data related to the different sponsors or advertisers of the racing vehicle, information on the driver or team, or other data. As the racing vehicle is racing, data may be transmitted for receipt by spectators interested in a particular sponsor, driver, team, or the like. A spectator could, for instance, be located in the grandstands at a racing venue and set a filter to receive information from a specific car, good/service category, or the like. Corresponding data may then be pulled or otherwise received (e.g., pushed to the user's communication device) from one or more cars, vendors, or others located at the racing venue. Other embodiments contemplate using advertising modules in other locations and in other manners. A street vendor, brick-and-mortar store (e.g., the store itself, a sign near a roadway, etc.), shopping center, taxi cab, parade participant, or other person or entity may use an advertising module in a manner contemplated in view of the disclosure herein to transmit relevant data to a vehicle, user communication device, or other recipient.

It will be understood from the foregoing description that modifications and changes may be made in various embodiments of the present disclosure without departing from its true spirit. While the foregoing written description of the present disclosure enables one of ordinary skill to make and use embodiments of the present disclosure, those of ordinary skill will understand and appreciate the existence of variations, combinations, and equivalents of the specific embodiment, method, and examples herein. Indeed, any feature or component disclosed herein is contemplated for use in isolation or in combination with any one or more other features. The present disclosure should therefore not be limited by the above described embodiments, methods, systems, or examples, but to include all embodiments and methods within the scope and spirit of the present disclosure.

Moreover, embodiments of the present disclosure may be used in connection with various end-user communication devices or systems. For instance, web pages, the Cloud, applications, interfaces, firmware, and the like may be used with a number of types of suitable electronic devices. Examples of suitable electronic devices may include, for example only, cell phones, smart phones, personal digital assistants (PDAs), tablet computing devices, netbooks, e-readers, laptop computers, desktop computers, media players, navigation systems, cameras, other devices capable of reading data from a local data store or communicating data over a data network, or any combination of the foregoing. In at least one embodiment, a network may be capable of carrying electronic communications. The Internet, local area networks, wide area networks, virtual private networks (VPN), telephone networks, point-to-point wireless networks, other communication networks or channels, or any combination of the forgoing may thus be represented by a network.

A network and devices connected thereto may operate in a number of different manners. Different manners of operation may be based at least in part on a type of the network or a type of connection to the network. For instance, various components of a system may include hardwired communication components and/or wireless communication components or interfaces (e.g., 802.11/WiFi, Bluetooth, BLE, CDMA, LTE, GSM, HSPA+, IR, extended IR, NFC, etc.). Moreover, the network may include multiple networks interconnected to facilitate communication between one or more electronic devices or systems. Embodiments of the present disclosure may also use multiple communication systems in combination. For instance, an illustrative example may use one wireless communication system to communicate with an advertising module (e.g., a relatively short-range wireless protocol such as Bluetooth, BLE, WiFi, Rubee, RFID, DSRC, Z-Wave, Zigbee, etc). A second communication network or interface may be used to communicate with other systems. For instance, a mobile device may download an advertising application via a WiFi network, or even a hardwired network. In other embodiments, a mobile device may download an application from an app store using a CDMA, GSM, HSPA+, LTE, or other relatively longer-range wireless communication protocol).

Embodiments of the present disclosure may generally be performed by a computing device, and more particularly performed in response to instructions provided by an application, process, web page, or component executing on the computing device or within a computing system, including an advertising module. Hardware, firmware, software, or any combination of the foregoing may be used in directing the operation of a computing device or system. Embodiments of the present disclosure may thus comprise or utilize a special purpose or general-purpose computer including computer hardware, such as, for example, one or more processors and system memory, as discussed in greater detail herein. Embodiments within the scope of the present disclosure also include physical and other computer-readable media for carrying or storing computer-executable instructions and/or data structures, including applications, tables, or other modules used to execute particular functions or direct selection or execution of other modules. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media.

Examples of computer storage media include RAM, ROM, EEPROM, CD-ROM or other optical disk storage, magnetic disk storage or other magnetic storage devices, or any other non-transmission medium which can be used to store desired program code means in the form of computer-executable instructions or data structures and which can be accessed by a general purpose or special purpose computer.

A "network", "data network", or "communication network" may generally be defined as one or more data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instructions or data structures and which can be accessed by a general purpose or special purpose computer. Combinations of physical storage media and transmission media should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, mainframe computers, mobile telephones, PDAs, servers, and the like. Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices. Cloud-based and software-as-a-service systems are examples of distributed environments which may be used in connection with embodiments of the present disclosure.

Although the foregoing description contains many specifics, these should not be construed as limiting the scope of the invention or of any of the appended claims, but merely as providing information pertinent to some specific embodiments that may fall within the scopes of the invention and the appended claims. Various embodiments are described, some of which incorporate differing features. The features illustrated or described relative to one embodiment are interchangeable and/or may be employed in combination with features of any other embodiment herein. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed is:

1. A blimp for providing an offer for services provided in conjunction with the blimp, comprising:
    a blimp configured to be used in conjunction with a set of services and the offer for services;
    a location determination system configured to determine a current location of the blimp;
    a first wireless interface configured to receive offer information and to transmit data regarding distribution of the offer information, the offer information associated with a geographic area and services provided in conjunction with the blimp;
    a non-transitory computer-readable medium configured to store the offer information and the distribution of the offer information;
    a second wireless network interface configured to communicate with a wireless device within a local transmission range of the second wireless interface and transmit the offer wirelessly to an application executing on the wireless device based at least in part on the current location of the blimp, the geographic area associated with the offer and a configuration identifying types of advertising or promotional information to deliver to the mobile device.

2. The blimp recited in claim 1, wherein the second wireless network is further configured to communicate with a downloadable dedicated advertising application executing on the wireless device, the downloadable dedicated advertising application configured to perform one or more of:
    pull the at least one of advertising and promotional information and messages wirelessly over the second wireless network; and
    receive the at least one of advertising and promotional information and messages pushed wirelessly over the second wireless network.

3. The blimp recited in claim 1, wherein the second wireless network is further configured to communicate with an advertising application that is configured to obtain the at least one of advertising and promotional information and messages over the second wireless network interface only when in wireless range of the first wireless network interface.

4. The blimp recited in claim 1, further comprising a commercialization module for tracking distribution of the offer information.

5. The blimp recited in claim 1, wherein the first wireless network interface uses one or more short-range wireless communication protocols.

6. The blimp recited in claim 5, wherein the one or more short-range wireless communication protocols include:
- Bluetooth;
- Bluetooth Low Energy (BLE);
- RFID;
- DSRC;
- RuBee;
- WiFi;
- Z-Wave; or
- Zigbee.

7. The blimp recited in claim 1, wherein the second wireless network interface uses a same communication protocol as the first wireless network interface.

8. The blimp recited in claim 1, wherein the non-transitory computer-readable medium and a downloadable dedicated advertising application are accessible over a third network interface.

9. The blimp recited in claim 8, wherein the third network interface is different than one or both of the first and second wireless network interfaces.

10. The blimp recited in claim 8, wherein the third network interface is accessible to the one or more mobile electronic devices using at least one long-range wireless communication protocol.

11. The blimp recited in claim 10, wherein the at least one long-range wireless communication protocol includes one or more of:
- GSM;
- CDMA;
- LTE; or
- HSPA+.

12. The blimp recited in claim 1, wherein a downloadable dedicated advertising application in communication with the blimp is free for download by users of the one or more mobile electronic devices.

13. The blimp recited in claim 1, further comprising one or more advertising modules that are configured to track information related to the transmission of the at least one of advertising and promotional information and messages.

14. The blimp recited in claim 1, further comprising one or more dedicated advertising modules that are configured to track at least one of a number of a pull requests made for at least one of advertising and promotional information and messages and a number of times the at least one of advertising and promotional information and messages is transmitted.

15. The blimp recited in claim 1, further comprising one or more dedicated advertising modules that are configured to determine a volume of consumer traffic proximate thereto.

16. A communication system for providing at least one of advertising and promotional information and messages relevant to a user, comprising:
- one or more dedicated advertising systems coupled to a blimp comprising:
- storage configured for storing at least one of advertising, promotional information or messages for a first entity responsible for the blimp and a second entity and configured for storing distribution information of the at least one of advertising, promotional information or messages;
- a location determination system configured to determine a current location of the communication system; an exterior display to identify the first entity;
- a first wireless network interface for transmitting the at least one of advertising, promotional information or messages wirelessly to an advertising application executing on one or more mobile electronic devices within a local transmission range, the at least one of advertising and promotional information selected based at least in part on the current location, the geographic area associated with the advertising and promotional information and messages and a configuration received from the one or more mobile electronic devices identifying types of advertising or promotional information to deliver to the one or more mobile electronic devices; and
- a second wireless network interface configured for receiving the at least one of advertising, promotional information or messages and for transmitting data regarding distribution information regarding the advertising, promotional information or messages.

17. The communication system recited in claim 16, further comprising a control system configured to receive location information from the location determination system and provide the location information to an advertising service over the second wireless network interface.

18. The communication system recited in claim 16, wherein the second entity provides additional independent advertising, promotional information or messages that are in addition to the at least one of advertising, promotional information or messages provided by the first entity.

19. The communication system recited in claim 16, further comprising a control system configured to identify demographic information from the advertising application executing on one or more mobile electronic devices.

20. The blimp recited in claim 16, wherein each of the first entity and the second entity comprise a commercial entity.

21. The blimp recited in claim 20, wherein the first entity charges a fee to the second entity for wirelessly transmitting at least one of advertising and promotional information and messages for the second entity.

* * * * *